United States Patent [19]

Shinjo et al.

[11] Patent Number: 6,005,540
[45] Date of Patent: Dec. 21, 1999

[54] IMAGE-FORMING APPARATUS AND METHOD OF DRIVING THE SAME

[75] Inventors: Katsuhiko Shinjo, Isehara; Hideaki Mitsutake, Yokohama, both of Japan

[73] Assignee: Canon Kabushiki Kaisha, Tokyo, Japan

[21] Appl. No.: 08/944,556

[22] Filed: Oct. 7, 1997

[30] Foreign Application Priority Data

Oct. 7, 1996 [JP] Japan .................................. 8-265837
Oct. 7, 1997 [JP] Japan .................................. 8-274195

[51] Int. Cl.$^6$ .................................................. G09G 3/22
[52] U.S. Cl. ........................... 345/74; 313/309; 315/167
[58] Field of Search ................................ 345/45, 47, 65, 345/73–75; 313/309, 336, 351; 3115/167, 169.3

[56] References Cited

U.S. PATENT DOCUMENTS

| | | | |
|---|---|---|---|
| 5,066,883 | 11/1991 | Yoshioka et al. | 313/309 |
| 5,754,148 | 5/1998 | Kishino | 345/74 |
| 5,828,352 | 10/1998 | Nomura et al. | 345/74 |
| 5,859,502 | 1/1999 | Spindt et al. | 315/169.3 |
| 5,866,988 | 2/1999 | Oda | 315/169.1 |
| 5,872,541 | 2/1999 | Yoshioka et al. | 345/74 |

FOREIGN PATENT DOCUMENTS

| | | |
|---|---|---|
| 0 619 594 | 10/1994 | European Pat. Off. . |
| 57-118355 | 7/1982 | Japan . |
| 63-274047 | 11/1988 | Japan . |
| 01031332 | 2/1989 | Japan . |
| 02257551 | 10/1990 | Japan . |
| 94/18694 | 8/1994 | WIPO . |

OTHER PUBLICATIONS

M.I. Elinson et al., "The Emission of Hot Electrons and the Field Emission of Electrons from Tin Oxide," Radio Eng. and Electronic Phys. 10, 1290 (1965).

G. Dittmer, "Electrical Conduction and Electron Emission of Discontinuous Thin Films," Thin Solid Films 9, 317 (1972).

M. Hartwell et al., "Strong Electron Emission From Patterned Tin–Indium Oxide Thin Films," Technical Digest 21st IEDM (Washington, D.C. 1975), p. 519.

H. Araki et al., "Electroforming and Electron Emission of Carbon Thin Films," J. Vacuum Soc. of Japan 26, 22 (1983).

W.P. Dyke et al., "Field Emission," in Advances in Electronics and Electron Physics vol. 8, p. 90 (L. Morton, ed.). New York: Academic Press, 1956.

C.A. Spindt et al., "Physical properties of thin–film field emission cathodes with molybdenum cones," J. Appl. Phys. 47,5248 (1976).

C.A. Mead, "Operation of Tunnel–Emission Devices," J. Appl. Phys. 32,646 (1961).

*Primary Examiner*—Matthew Luu
*Assistant Examiner*—Vanel Frenel
*Attorney, Agent, or Firm*—Fitzpatrick, Cella, Harper & Scinto

[57] ABSTRACT

A plurality of electron-emitting devices carried on a device substrate are arranged vis-a-vis an acceleration electrode carried on a face plate. The device substrate and the face plate, together with side walls disposed therebetween, constitute an envelope the inner space of which is kept under vacuum. A number of spacers are also disposed between the device substrate and the face plate within the inner space. The electric potential $V_a$ applied to the acceleration electrode, the distance 1 between the electron-emitting devices and the corresponding respective spacers, and the distance d between the electron-emitting devices and the acceleration electrode satisfy the relationship, $V_a \cdot l^2/d^2 > |\Delta V_{sat}|/(2 \cdot \alpha \cdot \beta)$, where α and β are constants determined from several factors and $\Delta V_{sat}$ is the potential deviation of the spacer surface under charged conditions from that under uncharged conditions.

16 Claims, 28 Drawing Sheets

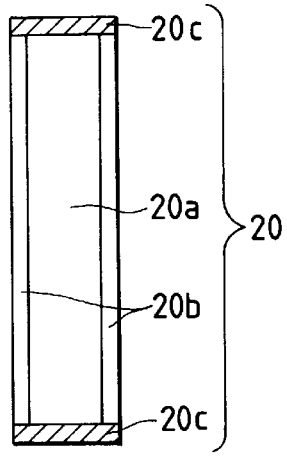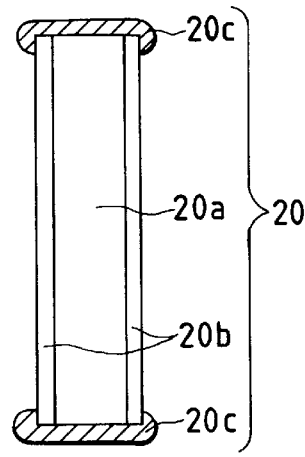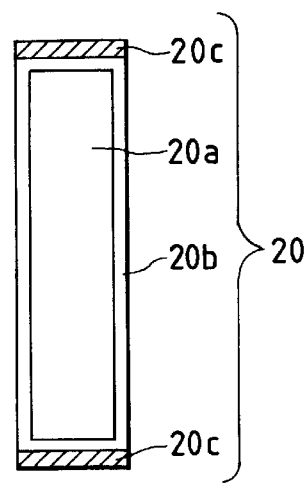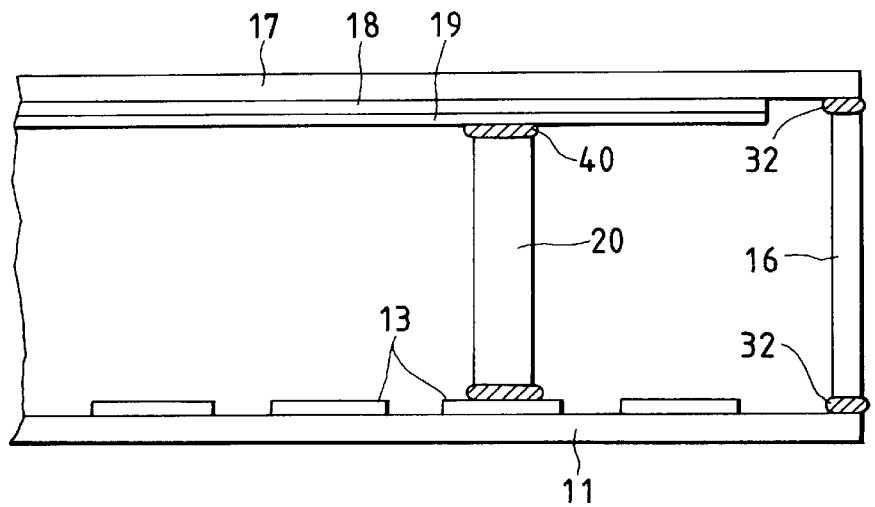

FIG. 20
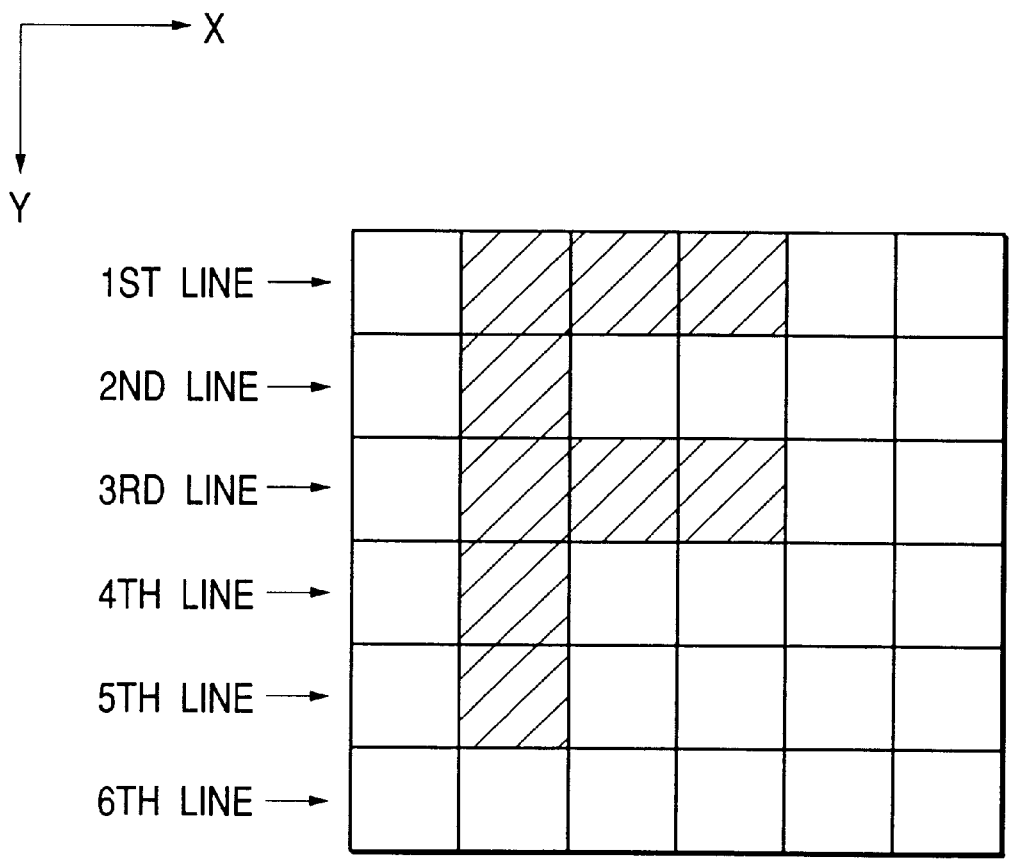
 : LIGHT EMISSION
 : NO LIGHT EMISSION

FIG. 23
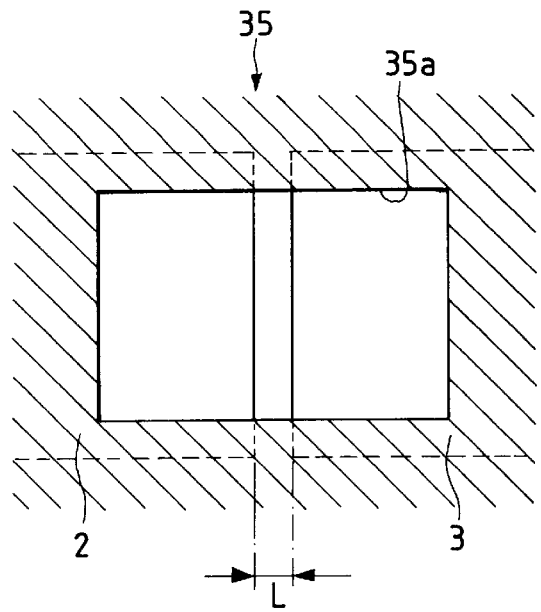
FIG. 24
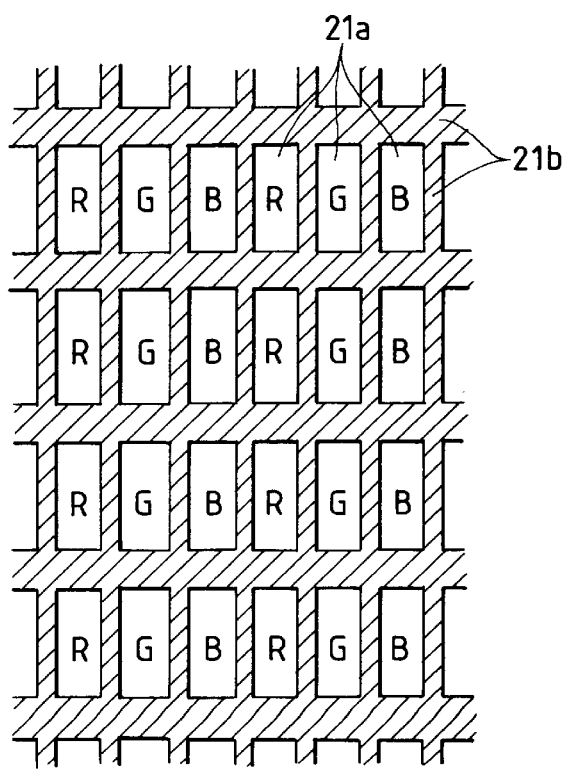
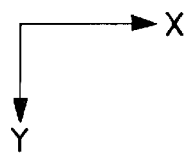

IMAGE-FORMING APPARATUS AND METHOD OF DRIVING THE SAME

BACKGROUND OF THE INVENTION

1. Field of the Invention

This invention relates to an image-forming apparatus such as a display apparatus using electron beams and, more particularly, it relates to an image-forming apparatus comprising spacers arranged within the envelope of the apparatus to internally support the envelope against the atmospheric pressure.

2. Related Background Art

There have been known two types of electron-emitting devices, which are the thermionic electron source and the cold cathode electron source. Cold cathode electron sources refer to the field emission type (hereinafter referred to as the FE type), the metal/insulation layer/metal type (hereinafter referred to as the MIM type) and the surface conduction electron-emitting type (hereinafter referred to as the SCE type).

Examples of SCE type device include the one proposed in M. I. Elinson, Radio Eng. Electron Pys., 10 (1965).

An SCE type device is realized by utilizing the phenomenon that electrons are emitted out of a thin film with a small area formed on a substrate when an electric current is forced to flow in parallel with the film surface. While Elinson proposes the use of $SnO_2$ thin film for a device of this type, the use of Au thin film is proposed in G. Dittmer: "Thin Solid Films", 9, 317 (1972) whereas the use of $In_2O_3/SnO_2$ thin film and that of carbon thin film are also discussed respectively in M. Hartwell and C. G. Fonstad: "IEEE Trans. ED Conf.", 519 (1975) and H. Araki et al.: "Vacuum", Vol. 26, No. 1, p. 22 (1983).

FIG. 30 of the accompanying drawings schematically illustrates a typical surface conduction electron-emitting device proposed by M. Hartwell. In FIG. 30, reference numeral 3001 denotes an insulating substrate. Reference numeral 3004 denotes an electron-emitting region-forming thin film, which is a thin metal oxide film prepared by sputtering, using an H-shaped pattern, in which an electron-emitting region 3005 is produced when it is subjected to an electrically energizing process referred to as "energization forming" as will be described hereinafter. In FIG. 30, a pair of device electrodes are separated by a length L of 0.5 to 1[mm] and have a width W of 1.0[mm].

Conventionally, an electron emitting region 3005 is produced in a surface conduction electron-emitting device by subjecting the electron-emitting region-forming thin film 3004 of the device to an electrically energizing process, which is referred to as energization forming. In the energization forming process, a constant DC voltage or a slowly rising DC voltage that rises typically at a very slow rate of 1 V/min. is applied to given opposite ends of the electron-emitting region-forming thin film 3004 to partly destroy, deform or transform the film and produce an electron-emitting region 3005 which is electrically highly resistive. Thus, the electron-emitting region 3005 is part of the electron-emitting region-forming thin film 3004 that typically contains a fissure or fissures therein so that electrons may be emitted from the fissure and its vicinity. The electron-emitting region-forming thin film 3004 including the electron-emitting region produced by energization forming will be referred to as the electron-emitting region-containing thin film. Note that, once subjected to an energization forming process, a surface conduction electron-emitting device comes to emit electrons from its electron emitting region 3005 whenever an appropriate voltage is applied to the electron-emitting region-containing thin film 3004 to make an electric current run through the device.

Examples of FE type device include those proposed by W. P. Dyke & W. W. Dolan, "Field emission", Advance in Electron Physics, 8, 89 (1956) and C. A. Spindt, "PHYSICAL Properties of thin-film field emission cathodes with molybdenum cones", J. Appl. Phys., 47, 5284 (1976). FIG. 31 of the accompanying drawings shows a schematic cross sectional view of a device proposed by C. A. Spindt et al., which is a typical FE type device. Referring to FIG. 31, it comprises a substrate 3010, an emitter wiring layer 3011 made of a conductive material, a conical emitter 3012, an insulation layer 3013 and a gate electrode 3014. The device emits electrons from the tip of the conical emitter 3012 as an appropriate voltage is applied to the conical emitter 3012 and the gate electrode 3014.

While the FE type device illustrated and described above has a multilayer structure, the emitter and the gate electrode may alternatively be arranged on the substrate substantially in parallel with the plane of the substrate.

Examples of MIM type device are disclosed in papers including C. A. Mead, "The tunnel-emission amplifier", J. Appl. Phys., 32, 646 (1961). FIG. 32 of the accompanying drawings shows a schematic cross sectional view of a typical MIM type device. Referring to FIG. 32, it comprises a substrate 3020, a lower metal electrode 3021, a thin insulation layer 3022 having a thickness of about 10[nm] and an upper metal electrode having a thickness of about 30[nm].

The MIM type device emits electrons from the surface of the upper electrode 3023 as an appropriate voltage is applied between the upper electrode 3023 and the lower electrode 3021.

Contrary to a thermionic device, a cold cathode device is adapted to emit electrons at low temperature and hence does not need a heater. Consequently, the former has a simplified structure if compared with the latter and, therefore, it is possible to prepare very small cold cathode devices, which are relatively free from problems such as a thermally molten substrate if they are densely arranged on a substrate.

Additionally, while the responsiveness of a thermionic device is defined by that of the heater used for it, a cold cathode device is free from such a problem and hence a highly responsive cold cathode device can be realized without difficulty.

In view of the above listed advantages and other advantages, efforts have been paid to develop electron beam apparatus, image-forming apparatus in particularly, comprising cold cathode devices.

Particularly, the surface conduction electron-emitting device provides a remarkable advantage that a large number of devices can be arranged over a large area because of the structural simplicity they have. Studies have been made to exploit this advantage for various applications. Applications of surface conduction electron-emitting devices include electrically charged beam sources and display apparatus.

Applications of surface conduction electron-emitting devices arranged in numbers include electron sources realized by arranging surface conduction electron-emitting devices in parallel rows and connecting them through the opposite ends of each of the devices by means of wires to form a matrix of devices (see, inter alia, Japanese Patent Application Laid-Open No. 1-031332 filed by the applicant of the present patent application). While flat panel type display apparatus utilizing liquid crystal have been replacing CRTs in the field of image-forming apparatus including display apparatus, they have a drawback that they are not of the emission type and hence required to be provided with a back light. Therefore, there has been a strong demand for emission type display apparatus. Emission type display apparatus capable of displaying high quality images include image-forming apparatus having a large display screen that can be realized with relative ease by combining an electron source comprising a large number of surface conduction electron-emitting devices and fluorescent bodies adapted to emit visible light by electrons emitted from the devices (see, inter alia, U.S. Pat. No. 5,066,883 issued to the applicant of the present patent application).

An electron beam appratus that can be used for image-forming apparatus as described above typically comprises an envelope for maintaining vacuum within the apparatus, an electron source arranged in the envelope, targets to be irradiated with respective electron beams emitted from the electron source and an acceleration electrode for accelerating the electron beams directed to the respective targets. In addition to the above components, it may additionally comprise spacers for supporting the envelope from the inside against the atmospheric pressure.

The arrangement of such spacers within the envelope is indispensable for an image-forming apparatus of the above described type particularly when a large display screen is used and/or when the apparatus has to be made very thin.

When spacers are used within the envelope, there arise problems including (1) that electric discharges occur when electron beams are accelerated by a high voltage and (2) that electron beams are deviated from the intended respective routes to miss the respective targets (a phenomenon referred to as "beam deviation" hereinafter). The latter problem can result in a displaced and/or deformed light emitting spot produced on the target of each fluorescent body of the image-forming apparatus that can significantly degrade the quality of the display image. Particularly, when the image-forming member of the image-forming apparatus comprises fluorescent bodies for red, green and blue for displaying color images, the problem (2) as identified above can entail a deteriorated brightness and a phenomenon of color breakup. These problems are particularly remarkable at locations close to the spacers arranged between the electron source and the image-forming member presumably because electron beams and charged particles generated within the envelope under the effect of emitted electron beams can collide, at least partly, with the surfaces of the spacers to produce secondary electrons which by turn electrically charge the surfaces of the spacers and disturb the electric fields on and near the spacers so that consequently the electron beams in the envelope are deviated from there intended respective routes.

In an attempt to bypass this problem, there have been proposed a number of techniques for removing the electric charge of the spacers by using an electrically conductive material for the spacers.

For example, Japanese Patent Application Laid-Open No. 57-118355 describes a method of coating the surfaces of the plate-shaped spacers having holes at locations respectively corresponding to the thermionic cathodes with tin oxide in order to remove electrons adhering to the wall surfaces of the holes in an image-forming apparatus comprising thermionic devices. It also described that the electric conductivity of the spacers is such that an electric current between 10 pA and 0.001 µA flows when a voltage of 10 V is applied between the electrodes arranged oppositely with the spacers interposed therebetween.

PCT/US94/00602 described the use of electrically conductive spacers having a secondary electron emitting efficiency close to 1 in order to minimize fluctuations in the potential of the spacers. Such electrically conductive spacers have a sheet resistance of $10^9$ to $10^{14}$ $\Omega/\square$ and a film thickness of 0.05 to 20 µm and are made of chromium oxide, copper oxide, carbon or the like. The inventor presumes that fluctuations in the potential of the spacers are caused by emitted secondary electrons and defines the potential deviation $\Delta V$ at a position separated from distance x on a spacer held in contact with the substrate of the image-forming apparatus by formula (1) below;

$$\Delta V = \rho_s \cdot [x \cdot (x-d)/2] \cdot j \cdot (1-\delta) \tag{1},$$

where d is the height of the spacer (distance between the device substrate and the acceleration electrode), $\rho_s$ is the surface resistance of the spacer, j is the current density colliding with the spacer surface and $\delta$ is the secondary electron emission efficiency of the surface of the spacer.

Japanese Patent Application Laid-Open No. 57-118355 as cited above uses plate-shaped spacers having holes and defines the electric conductivity of the spacers in terms of the electric current (between 10 µA and 0.001 µA) that flows through the spacer when a voltage is applied between the oppositely disposed electrodes with the spacers interposed therebetween. Thus, the current flowing region of each of the spacers varies depending on its profile and the above definition cannot be applied to spacers having a profile other than the one described there.

As for the technique of PCT/US94/00602, if the presumption that secondary electrons are mainly responsible to the electric charge of the spacers is correct, the potential of the spacer surface varies from the ground to the acceleration voltage that is typically several kV depending on the position on the surface and hence it is practically impossible to select a material and a set of conditions with which the secondary electron emission efficiency is substantially equal to 1 over such a wide energy range. In other words, a potential deviation inevitably appears at least on part of the spacer surface. Additionally, while the electric charge of the spacers can be reduced by using a highly conductive material for the spacers, the use of such a material is not practically feasible in terms of power consumption rate of the image-forming apparatus.

As a result, positional deviations and electric discharges occur when the electron-emitting devices are on for driving such an image-forming apparatus.

SUMMARY OF THE INVENTION

In view of the above identified problems, it is therefore an object of the present invention to provide a technique for preventing any positional deviation of an electron beam (beam deviation) on the target plane. Another object of the present invention is to provide an image-forming apparatus that comprises spacers for securing a predetermined depth of the envelope and can display clear images with, in the case of a color display, an excellent color reproducibility by preventing beam deviations, brightness degradation and color breakups without increasing the power consumption rate.

According to an aspect of the invention, the above objects are achieved by providing an image-forming apparatus comprising a device substrate carrying thereon an electron source comprising a plurality of cold cathode type electron-emitting devices, an acceleration electrode arranged oppositely relative to the device substrate for accelerating electrons emitted from the electron source, an envelope having a hermetically sealed structure for maintaining a vacuum condition between the device substrate and the acceleration electrode and a number of spacers for supporting the envelope, characterized in that the relationship between the electric potential $V_a$ of the acceleration electrode, the distance l between the electron-emitting devices and the corresponding respective spacers and the distance d between the electron-emitting devices and the acceleration electrode is expressed by the formula below;

$$V_a \cdot l^2/d^2 > |\Delta V_{sat}|/(2 \cdot \alpha \cdot \beta),$$

where $\alpha$ is a constant defined by the positional arrangement of the members that determine the potential profile within the image-forming apparatus, $\beta$ is a constant defining the allowable deviational range of the brilliant points on the image display member of the apparatus and $\Delta V_{sat}$ is the potential deviation from the electric potential of the spacer surface when the latter is not electrically charged under normal driving condition of the apparatus, the potential deviation being defined by the equation below;

$$\Delta V_{sat} = RQ'/8 \cdot (1 - \exp(-\Delta t/\tau_u))/(1 - \exp(-\Delta T/\tau_d)),$$

where R is the electric resistance of each spacer in the direction perpendicular to the device substrate, Q' is the rate of change of the electric charge of the spacer surface, $\Delta T$ is the time period for displaying a frame of an image, $\Delta t$ is the time period for driving a device, $\tau_u$ is the time constant for electrically charging the spacer and $\tau_d$ is the time constant for completely releasing the electric charge from the spacer.

According to another aspect of the invention, there is provided a method of driving an image-forming apparatus comprising a device substrate carrying thereon an electron source comprising a plurality of cold cathode type electron-emitting devices, an acceleration electrode arranged oppositely relative to the device substrate for accelerating electrons emitted from the electron source, an envelope having a hermetically sealed structure for maintaining a vacuum condition at least between the device substrate and the acceleration electrode and a number of spacers for supporting the envelope, characterized in that the time period $\Delta T$ for displaying a frame of an image and the time period $\Delta t$ for driving a device satisfy the relationship expressed by the formula below;

$$(1-\exp(-\Delta t/\tau_u))/(1-\exp(-\Delta T/\tau_d)) < (2 \cdot \alpha \cdot \beta) \cdot l^2 \cdot d^2/V_a \cdot 8|R \cdot Q'|$$

where R is the electric resistance of each spacer in the direction perpendicular to the device substrate, Q' is the rate of change of the electric charge of the spacer surface, $\tau_u$ is the time constant for electrically charging the spacer, $\tau_d$ is the time constant for completely releasing the electric charge from the spacer, l is the distance between the electron-emitting devices and the corresponding respective spacers, d is the distance between the electron-emitting devices and the acceleration electrode, $V_a$ is the electric potential of the acceleration electrode potential, $\alpha$ is a constant defined by the positional arrangement of the members that determine the potential profile within the image-forming apparatus and $\beta$ is a constant defining the allowable deviational range of the brilliant points on the image display member of the apparatus.

BRIEF DESCRIPTION OF THE DRAWINGS

FIGS. 7A, 7B and 7C are enlarged schematic cross sectional views of spacers that can be used for an image-forming apparatus according to the invention.

FIG. 8 is an enlarged schematic cross sectional view of a spacer used with abutments in an image-forming apparatus according to the invention.

FIG. 20 is an enlarged schematic partial view of an image to be displayed by an image-forming apparatus according to the invention, showing how the latter is driven to operate.

FIG. 23 is a schematic plan view of a mask that can be used for preparing a thin film for forming an electron-emitting region in a surface conduction electron-emitting device for the purpose of the present invention.

FIG. 24 is a schematic plan of a fluorescent film having an alternative configuration that can be used for the purpose of the invention.

DETAILED DESCRIPTION OF THE PREFERRED EMBODIMENTS

Figure 1:
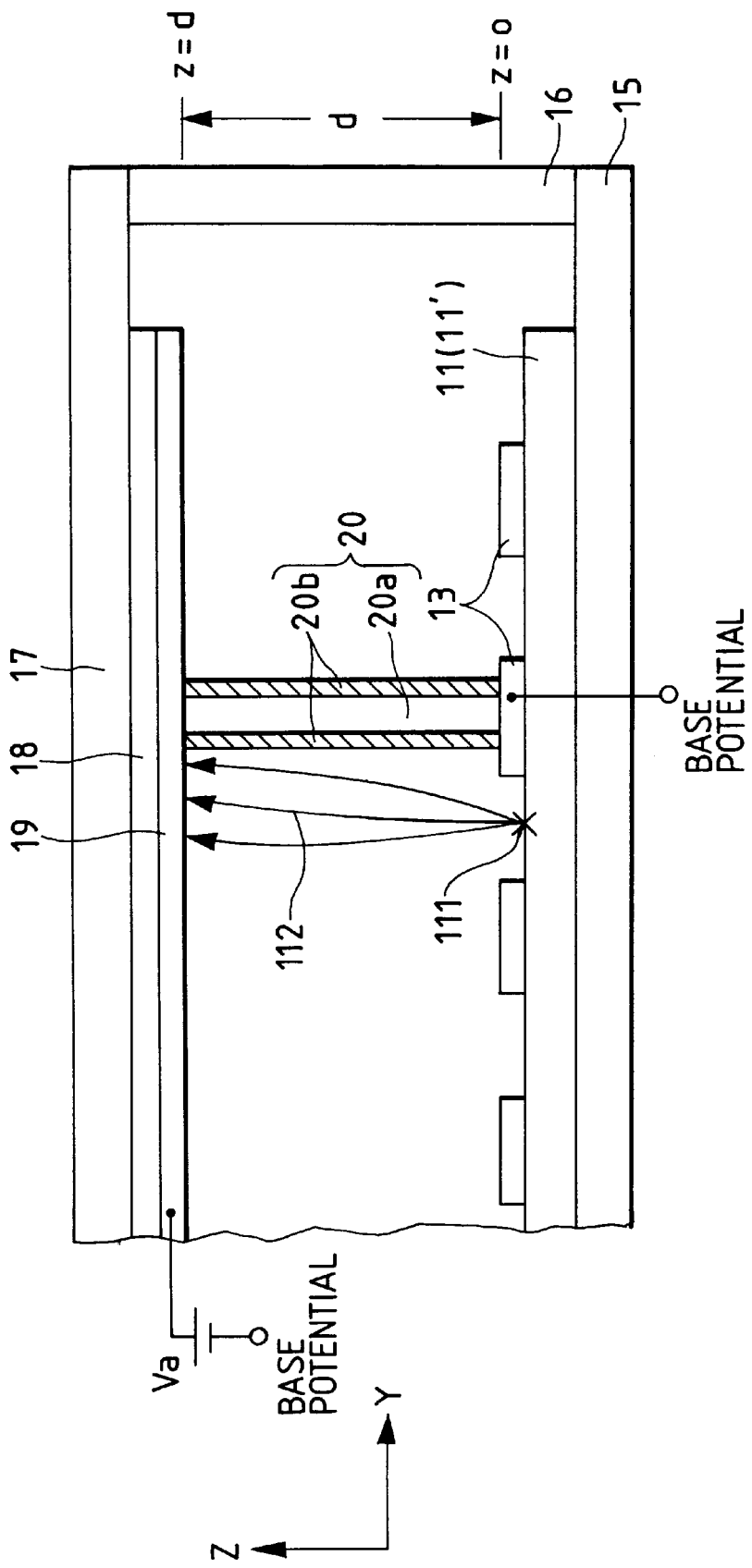
FIG. 1 is an enlarged schematic partial cross sectional view taken along line 1—1 of FIG. 2, showing a spacer and its vicinity.

Now, the present invention will be described in greater detail in terms of preferred modes of carrying it out.

The present invention is based on a finding that, when an image-forming apparatus of the type under consideration is provided with spacers that are coated with highly grainy or noncrystalline thin film, positional deviations of electron beams on the target plane (beam deviations) can be prevented in the image-forming apparatus by appropriately controlling the capacitance and the time constant for releasing the electric charge of the spacer and, if the time constant is relatively large, by optimizing the conditions (including the frame frequency for displaying images, the pulse width of the voltage for driving the electron-emitting devices and the acceleration voltage) for driving the apparatus and the configuration (the relative positional arrangement of the electron-emitting devices and the spacers and the distance between the electron-emitting devices and the electrode for applying an acceleration voltage). Particularly, the above finding is applicable to displaying clear images with, in the case of a color display, an excellent color reproducibility and preventing beam deviations, brightness degradation and color breakups without increasing the power consumption rate when spacers are provided to maintain the depth of the envelope of the image-forming apparatus.

Thus, according to the invention, there is provided an image-forming apparatus comprising a device substrate carrying thereon an electron source comprising a plurality of cold cathode type electron-emitting devices, an acceleration electrode arranged oppositely relative to the device substrate for accelerating electrons emitted from the electron source, an envelope having a hermetically sealed structure for maintaining a vacuum condition between the device substrate and the acceleration electrode and a number of spacers for supporting the envelope, characterized in that the relationship between the electric potential $V_a$ of the acceleration electrode, the distance l between the electron-emitting devices and the corresponding respective spacers and the distance d between the electron-emitting devices and the acceleration electrode is expressed by the formula below;

$$V_a \cdot l^2 / d^2 > |\Delta V_{sat}|/(2 \cdot \alpha \cdot \beta),$$

where $\alpha$ is a constant defined by the positional arrangement of the members that determine the potential profile within the image-forming apparatus, $\beta$ is a constant defining the allowable deviational range of the brilliant points on the image display member of the apparatus and $\Delta V_{sat}$ is the potential deviation from the electric potential of the spacer surface when the latter is not electrically charged under normal driving condition of the apparatus, the potential deviation being defined by the equation below;

$$\Delta V_{sat} = RQ'/8 \cdot (1-\exp(-\Delta t/\tau_u))/(1-\exp(-\Delta T/\tau_d)),$$

where R is the electric resistance of each spacer in the direction perpendicular to the device substrate, Q' is the rate of change of the electric charge of the spacer surface, $\Delta T$ is the time period for displaying a frame of an image, $\Delta t$ is the time period for driving a device, $\tau_u$ is the time constant for electrically charging the spacer and $\tau_d$ is the time constant for completely releasing the electric charge from the spacer.

Preferably, the cold cathode electron-emitting devices of the electron source of an image-forming apparatus according to the invention are either surface conduction electron-emitting devices or field emission type electron-emitting devices. If surface conduction electron-emitting devices are used, the term of $2 \cdot \alpha \beta$ preferably has a value equal to or less than 5, more preferably equal to or less than 1. If field emission type electron-emitting devices are used, the term of $2 \cdot \alpha \cdot \beta$ preferably has a value equal to or less than 10, more preferably equal to or less than 2.

Preferably, the spacers are formed by layering a high resistance thin film on the surface of an insulating member, the high resistance thin film being electrically connected to electrodes on the device substrate, or a wire and an acceleration electrode, showing different respective potentials and, in order for controlling the electric resistance of the high resistance thim film as desired, made of finely grainy or noncrystalline film, thereby satisfying the equations of the invention.

In an image-forming apparatus comprising a device substrate carrying thereon an electron source comprising a plurality of cold cathode type electron-emitting devices, an acceleration electrode arranged oppositely relative to the device substrate for accelerating electrons emitted from the electron source, an envelope having a hermetically sealed structure for maintaining a vacuum condition between the device substrate and the acceleration electrode and a number of spacers for supporting the envelope, clear images can be displayed when the time period $\Delta T$ for displaying a frame of an image and the time period $\Delta t$ for driving a device satisfy the relationship expressed by the formula below;

$$(1-\exp(-\Delta t/\tau_u))/(1-\exp(-\Delta T/\tau_d)) < (2 \cdot \alpha \cdot \beta) \cdot l^2 \cdot d^2/V_a \cdot 8/|R \cdot Q'|$$

where R is the electric resistance of each spacer in the direction perpendicular to the device substrate, Q' is the rate of change of the electric charge of the spacer surface, $\tau_u$ is the time constant for electrically charging the spacer, $\tau_d$ is the time constant for completely releasing the electric charge from the spacer, l is the distance between the electron-emitting devices and the corresponding respective spacers, d is the distance between the electron-emitting devices and the acceleration electrode, $V_a$ is the electric potential of the acceleration electrode, $\alpha$ is a constant defined by the positional arrangement of the members that determine the potential profile within the image-forming apparatus and $\beta$ is a constant defining the allowable deviational range of the brilliant points on the image display member of the apparatus.

Now, the background of the present invention will be described. As discussed earlier, conventionally, only the static aspect of the disturbance that occurs in the electric field due to electrically charged spacers has been addressed. To the contrary, the inventors of the present invention found that it is very important for an image-forming apparatus of the type under consideration to know how the spacers become electrically charged as the electron-emitting devices are turned on to drive the image-forming apparatus and how the electric charge of the spacers becomes reduced after the electron-emitting devices are turned off by taking the dynamic aspect of electric charge/discharge of the spacers into consideration. In other words, if the spacers are electrically charged to a very small extent when the electron-emitting devices are turned on for electron emission, the electric charge of the spacers will be accumulated to a considerable level to disturb the potential distribution on and near the spacers to give rise to the phenomenon of deviated beams and undesired electric discharges if the electric charge of the spacers is not released before the next electron emitting cycle.

Figure 33:
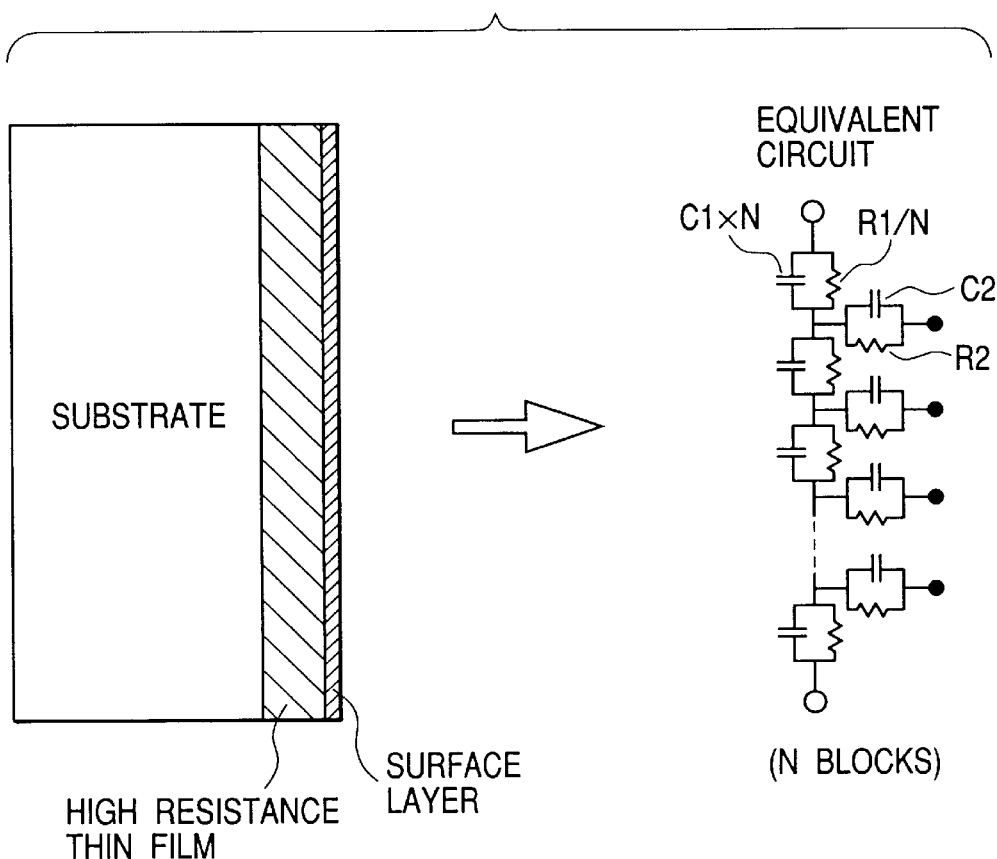
FIG. 33 is a circuit diagram of an equivalent circuit of a spacer that can be used for the purpose of the invention.

In order to suppress any undesired electric discharge and drive the apparatus stably at a low power consumption rate, the spacers are required to have a rather high electric resistivity. If each of the spacers are made to comprise an insulating base member coated with metal film (typically platinum film) showing a low specific resistance, the metal film has to be made very thin at the cost of reduced margins including the one for the thermal resistance withstanding the heat treatment process in the course of manufacturing the image-forming apparatus such that the film may show an island structure. Thus, while an inevitable alternative may be the use of a metal oxide having a high specific resistance as in the case of the above described known apparatus, the use of such a material more often than not results in a highly grainy or noncrystalline thin film. When highly grainy thin film is used as electroconductive film for spacers, though each grain shows noncrystalline properties, grain boundary will be noncrystalline. Then, defects are apt to appear concentratively on grain boundary, which can show a trapping capacitance due to the defect. Additionally, noncrystalline parts of the film can be oxidized easily to show a capacitance when it is baked in the atmosphere in the course of manufacturing the image-forming apparatus. Still additionally, if film of an oxide is used, it is difficult to achieve stoichiometric appropriateness and the film is often comprised of less oxygen than the stoichiometric ratio to become defective and show an capacitance. Finally, a multilayer film obtained by layering a plurality of films is used, it also come to show a capacitance on the interfaces of the component films. In short, the electric performance of a spacer can be expressed by an equivalent circuit as illustrated in FIG. 33. Referring to FIG. 33, R1 and C1 respectively represent the resistance and the capacitance of the spacer in the direction along the film surface, whereas R2 and C2 respectively represent the resistance and the capacitance in the direction perpendicular to the film surface. The time constant of the electric charge of the spacer (or the time constant for the spacer to move from an electrically charged condition to an electrically discharged condition) is defined in terms of R1, C1, R2 and C2. The inventors of the present invention discovered that the time constant for the electric charge releasing phase of a spacer is greater than the time constant for the electrically charging phase and that the large time constant for the electric charge releasing phase provides a problem for an image-forming apparatus being driven in a steady state. The inventors presume that the time constant for the electrically charging phase that occurs due to a trapping capacitance does not normally agree with its counterpart for the electric charge releasing phase because the former depends on the number of charged particles that strike the spacer surface and that the latter is generally greater than the former.

Figure 26:
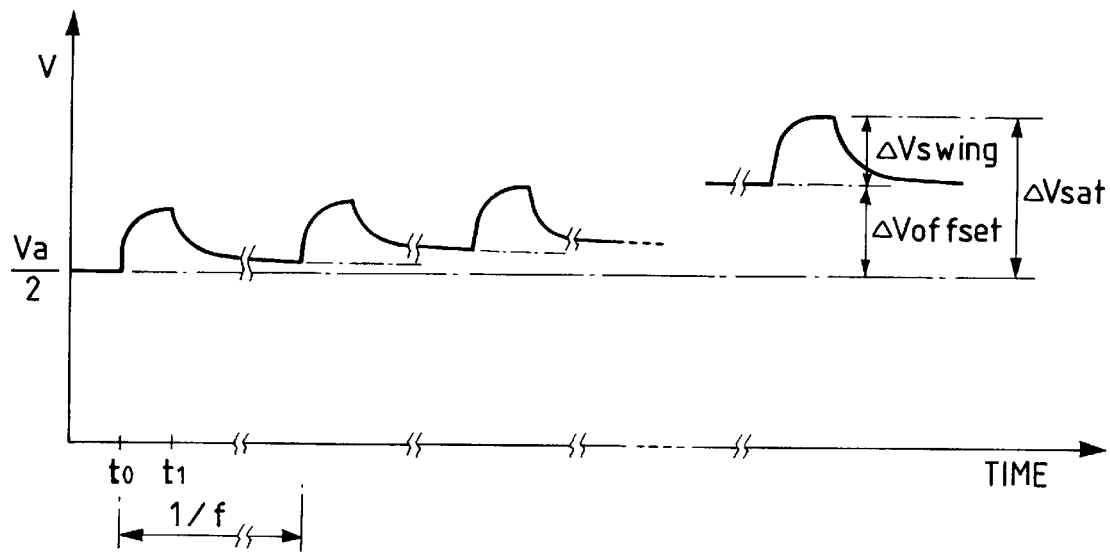
FIG. 26 is a graph showing the potential fluctuations on the surface of a spacer of an image-forming apparatus according to the invention.
Figure 27:
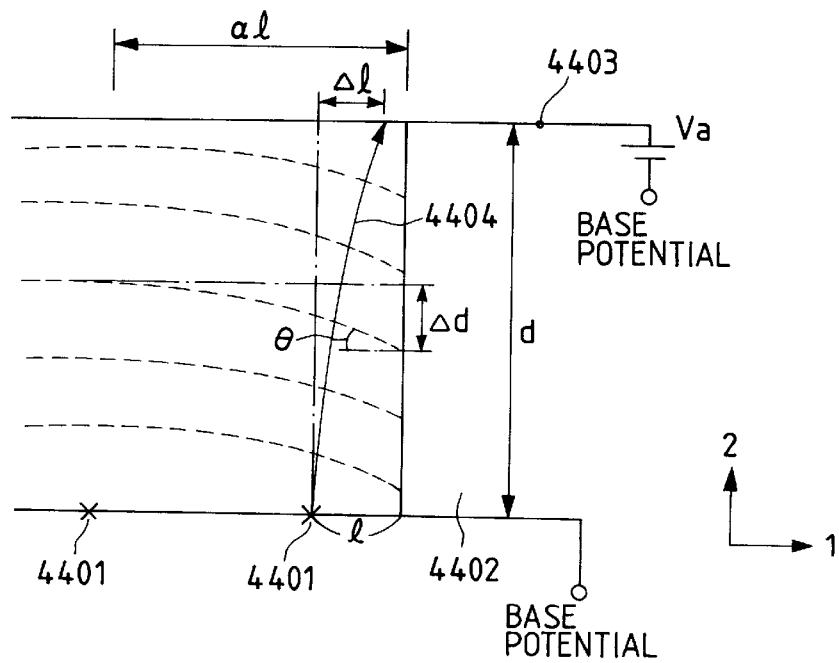
FIG. 27 is a schematic illustration of the relationship between the positional deviation of an electron beam and the dimensions of each panel member of an image-forming apparatus according to the invention.

Now, the principle underlying the present invention will be described by referring to FIGS. 1, 26 and 27.

FIG. 1 is a schematic partial cross sectional view of an image-forming apparatus according to the invention, showing its basic configuration. There are shown a substrate 11, a rear plate 15, a lateral wall 16 and a face plate 17, the envelope of the apparatus being constituted by the rear plate 15, the lateral walls 16 and the face plate 17. Reference numeral 20 denotes a spacer comprising an insulating member 20a and a high resistance thin film 20b formed on the insulating member. The apparatus additionally comprises a fluorescent member 18, an electrically conductive member (metal back) 19 and electrodes 13.

Reference numeral 111 denotes an electron source formed on the substrate 11. An electron beam 112 is emitted from the electron source 111 to form an image on the fluorescent member 18. If charged particles collide with the spacer surface or ejected therefrom for some reason or other, the potential distribution of the spacer surface can be modified from the initial pattern to give rise to beam deviation. For simplification, assume that charged particles collide with and ejected from the spacer surface at a uniform rate so that the electric charge on the spacer surface changes uniformly per unit time at a rate of Q'[C/sec] and that a high resistance thin film is evenly formed on the spacer surface to show a resistance of R[$\Omega$], a resistivity of $\rho$[$\Omega \cdot$m] and a permittivity of $\epsilon$[F/m]. Then, the electric potential V(z, t) (at location z and at time t) along the z-axis in FIG. 1 is expressed by equation (2) below during the period when electrons are emitted from the electron-emitting device;

$$V(z, t) = V_a/d \cdot z - RQ'/(2d^2) \cdot (1-\exp(-t(\epsilon \cdot \rho))) \cdot z(z-d) \quad (2),$$

where d is the height of the spacer and $V_a$[V] is the anode voltage.

Then, the potential deviation $\Delta V$ is expressed by formula (3) below;

$$\Delta V = -RQ'/(2d^2) \cdot (1-\exp(-t/(\epsilon \cdot \rho))) \cdot z(z-d) \tag{3}$$

This equation corresponds to the known equation (1) (although note that the positional variable for the electric potential V is expressed by x in equation (1), whereas it is expressed by z in equation (2)). Note that the term of $-RQ'/d^2$ in equation (3) corresponds to the term of $\rho \cdot j \cdot (1-\delta)$ of equation (1). It will be appreciated that, while only secondary electrons are taken into account in equation (1), the electrically charging mechanism is not limited thereto in equation (3). A noticeable difference between equation (1) and equation (3) lies in that whether the change with time in the electric potential is taken into consideration or not. More specifically, equation (3) includes a factor that exponentially changes with time.

If the electric charge changes uniformly at a rate of Q', the potential deviation will be greatest at the middle of the spacer (z=d/2) so that, the middle point expressed by z=d/2 will be used in the following discussion of the potential deviation.

The change with time in the electric potential V(d/2, t) at the center of the spacer (height z=d/2) is expressed by formula (4) below;

(the electrically charging phase)

$$V(d/2, t) = V_a/2 + RQ'/8 \cdot (1-\exp(-t/(\epsilon \cdot \rho))) \tag{4}$$

On the other hand, the change with time in the electric potential at the center of the spacer after the end of electron emission at time $t=t_1$ is expressed by equation (5) below; (the electrically discharging phase)

$$V(d/2, t) = (V(d/2, t_1) - V_a/2) \cdot \exp(-(t-t_1)/(\epsilon_d \cdot \rho_d)) \tag{5}$$

While the resistivity is expressed by $\rho_d [\Omega \cdot m]$ and the permittivity is expressed by $\epsilon_d [F/m]$ in the above formula, it should be noted that the time constant $\tau_u = \rho \cdot \epsilon$ for the charging phase is not equal to the time constant $\tau_d = \rho_d \cdot \epsilon_d$ for the discharging phase. Also note that not $\beta$ and $\epsilon$ but $\tau_u$ and $\tau_d$ are used in the following description.

The electric potential at the center of an electrically uncharged spacer changes in a manner as described above when a single pulse is applied. FIG. 26 illustrates a typical change in the electric potential at the center of a spacer when the electron source is driven. In FIG. 26, the solid line indicates the electric potential at the center of the spacer. Referring to FIG. 26, it will be seen that the electric potential rises in a manner substantially as defined by formula (4) while the electron source is being driven (from time t=0 to time $t=t_1$) and then gradually falls to the initial level ($V_a/2$) substantially according to equation (5) after the end of the pulse (note that Q' is a positive value here). As shown in FIG. 26, if the electric charge of each frame is not fully discharged, the residual charges are accumulated on the spacer until a steady state is reached when the electric charge is balanced with the electric discharge.

Since the electric charge is balanced with the electric discharge when the electron source is driven constantly (or continuously with the drive voltage having a frequency of f[Hz]), the below equations are respectively obtained from formulas (4) and (5) above for the potential rise during an electron-emitting operation $\Delta V_{swing}$, the potential offset $\Delta V_{offset}$ and the saturated potential rise $\Delta V_{sat} = \Delta V_{swing} + \Delta V_{offset}$;

$$\Delta V_{swing} = RQ'/8 \cdot (1-\exp(-\Delta t/\tau_u)) \tag{6}$$

and $$\Delta V_{swing} = \Delta V_{sat} \cdot (1-\exp(-\Delta T/\tau_d)) \tag{7},$$

thus $\Delta V_{sat}$ is expressed by equation (8) below;

$$\Delta V_{sat} = RQ'/8 \cdot (1-\exp(-t/\tau_u))/(1-\exp(-\Delta T/T\tau_d)) \tag{8},$$

where $\Delta T = 1/f$ and $\Delta t = t_1 - t_0$.

Now, the extent to which $\Delta V_{sat}$ has to be suppressed will be described by referring to FIG. 27, which schematically illustrates a spacer and its vicinity. Referring to FIG. 27, there are shown a pair of electron-emitting devices 4401, a spacer 4402 and an acceleration electrode 4403. Otherwise, $V_a$ denotes the acceleration voltage and l denotes the distance between the electron-emitting device and the spacer, whereas d denotes the distance between the electron-emitting device and the acceleration electrode. The broken lines in FIG. 27 represent equipotential surfaces when the spacer surface is electrically charged. Under this condition, the electron beam 4404 will be deviated from the target by $\Delta l$. When the electron source is driven to operate constantly and hence the charging rate and the discharging rate remain constant on the spacer surface, the potential deviation will be maximal at position z=d/2 on the spacer showing a value expressed by $\Delta V_{sat}$ at of equation (8). The deviation $\Delta d$ of the equipotential surfaces at and near the center of the spacer in FIG. 27 will be roughly expressed by formula (9) below;

$$\Delta d = d/2 \cdot \Delta V_{sat}/V_a \tag{9}.$$

Thus, if the equipotential surfaces are curved over a distance of al along the 1-axis from the spacer in FIG. 27 and $\Delta V_{sat}$ is not so large relative to $V_a$, the inclination of the equipotential surfaces is roughly expressed by formula (10) below;

$$\tan \theta = \sin \theta = d/(2\alpha l) \cdot \Delta V_{sat} \, t/V_a \tag{10},$$

where $\alpha$ is a factor, which is a constant between 1 and about 10 and determined as a function of the configuration and the position of each of the members such as electrodes that participate in defining electric potentials. The value of a will be about 2 when electron-emitting devices are arranged at regular intervals and a wire having a defined potential is arranged at the middle of the space separating two adjacent electron-emitting devices. Then, the average intensity of electric field to which each emitted electron will be expressed by formulas (11) and (12) below respectively for the directions along the 1- and 2-axes;

$$E1 = \Delta V_{sat}/2\alpha l \tag{11}$$

and $$E2 = V_a/d \tag{12}.$$

Since the deviation of an electron beam $\Delta l$ is substantially equal to $\Delta l = (E1/E2) \cdot d$, it will be expressed by formula (13) below;

$$\Delta l = 1/(2\alpha) \cdot d^2/l \cdot \Delta V_{sat}/V_a \tag{13}.$$

Thus, $\Delta V_{sat}$ is acceptable when it satisfies the relationship expressed by formula (14) below obtained from the relationship $\Delta l < \beta l$ defining the permissible limit for electron beam deviation in terms of the type of the electron source (e.g., the SCE type or the FE type) or the specifications of the image-forming apparatus as a whole;

$$\Delta V_{sat} < 2\alpha \beta \cdot l^2/d^2 \cdot V_a \tag{14},$$

where β is a constant defined by a number of parameters including the extent of expansion of the electron beam, the distance separating any two adjacent pixels on the target (depending, for example, on the existence or non-existence of a black stripe separating them), the characteristics of the fluorescent body on the target and the allowable brightness deviation within each pixel of the image-forming apparatus and typically having a value of a fraction of 1.

The coefficient 2αβ normally should have a value below 5, preferably below 1, to suppress the brightness deviation due to the beam deviation caused by an electric charge to less than about 10% when the image-forming apparatus comprises SCE type electron-emitting devices arranged at regular intervals and the distance separating any two adjacent pixels is about one-tenth of the width of a pixel. If the image-forming apparatus comprises FE type devices, the coefficient should have a value below 10, preferably below 2.

While the above description is for a uniform change in the electric charge, it can be applied to a case where the change in the electric charge varies and shows a certain distribution pattern so that a maximum change in the electric potential occurs at a location other than the center of the spacer. If such is the case, the maximum change in the electric potential may safely be assumed to be equal to $\Delta V_{sat}$.

In the process of actually designing an image-forming apparatus, the value of $\Delta V_{sat}$ is determined when spacers are specified and a desired display frequency and a voltage to be applied are given. Then, the next step will be the selection of respective values for $V_a$, l and d to meet the relationship expressed by the formula below;

$$V_a \cdot l^2/d^2 > |\Delta V_{sat}|/(2\alpha\beta) \qquad (15).$$

The absolute value expression of $|\Delta V_{sat}|$ is used in the above formula because $\Delta V_{sat}$ can take either a positive value or a negative value. In other words, while the foregoing description is based on the assumption that the spacer is positively charged, it may alternatively be charged negatively according to the material of the coating film and the conditions under which the spacer is used. For instance, if the electric charge is caused by emission of secondary electrons, the coefficient of secondary electron emission changes depending on the energy of incident electrons so that the spacer surface is charged negatively when the coefficient is smaller than 1 and positively when it is greater than 1. The spacers can be negatively charged if the acceleration voltage is low and the energy of incident electrons is small, particularly in the case where FE type devices are used. Thus, the above discussion is applicable to spacers that may be charged positively or negatively because the deflection of electron beams is caused to occur when the parallel electric field contours between the acceleration electrode and the electron-emitting device is distorted by electric charges, either negative or positive, on the spacers.

The above discussion can be summarized as follows.

As electron beams are emitted from the electron source of the image-forming apparatus, charged particles can collide with the spacer surface and be ejected therefrom for some reason or other to change the electric potential of the spacer surface relative to an electrically uncharged state. Under this condition, while there will not occur any accumulation of electric charges if the electric charge of the spacer surface is completely released before the next electron emitting cycle, a potential change expressed by $\Delta V_{sat}$ of formula (8) can take place during the period of a constant drive operation depending on the drive conditions. This $\Delta V_{sat}$ disturbs the electric field on and near the spacer to deviate the electron beam. Therefore, for the operation of displaying images, it is important to confine $\Delta V_{sat}$ within an acceptable range, which is determined as a function of not only the characteristics of the electron-emitting devices but also the drive conditions under which the devices are driven, the image display frequency and the relative positional arrangement of the components of the image-forming apparatus and should satisfy the relationship expressed by formula (15) above.

As results of intensive research efforts, the inventors of the present invention succeeded in satisfying the above relationship by using spacers prepared by forming an electrically highly resistive and highly grainy or noncrystalline thin film on an insulating member typically made of soda lime glass or a ceramic material. A notable thing about such spacers is that, as described above, the time constant $\tau_d$ for the electrically discharging phase is greater than the time constant $\tau_u$ for the electrically charging phase.

Note that a material having a relatively high resistivity such as an oxide or a semiconductor material is used for the electrically highly resistive thin film which is made to show a desired electric resistance in terms of the discharging effect, the power consumption rate and the effect of avoiding thermal run away due to temperature changes.

Figure 28:
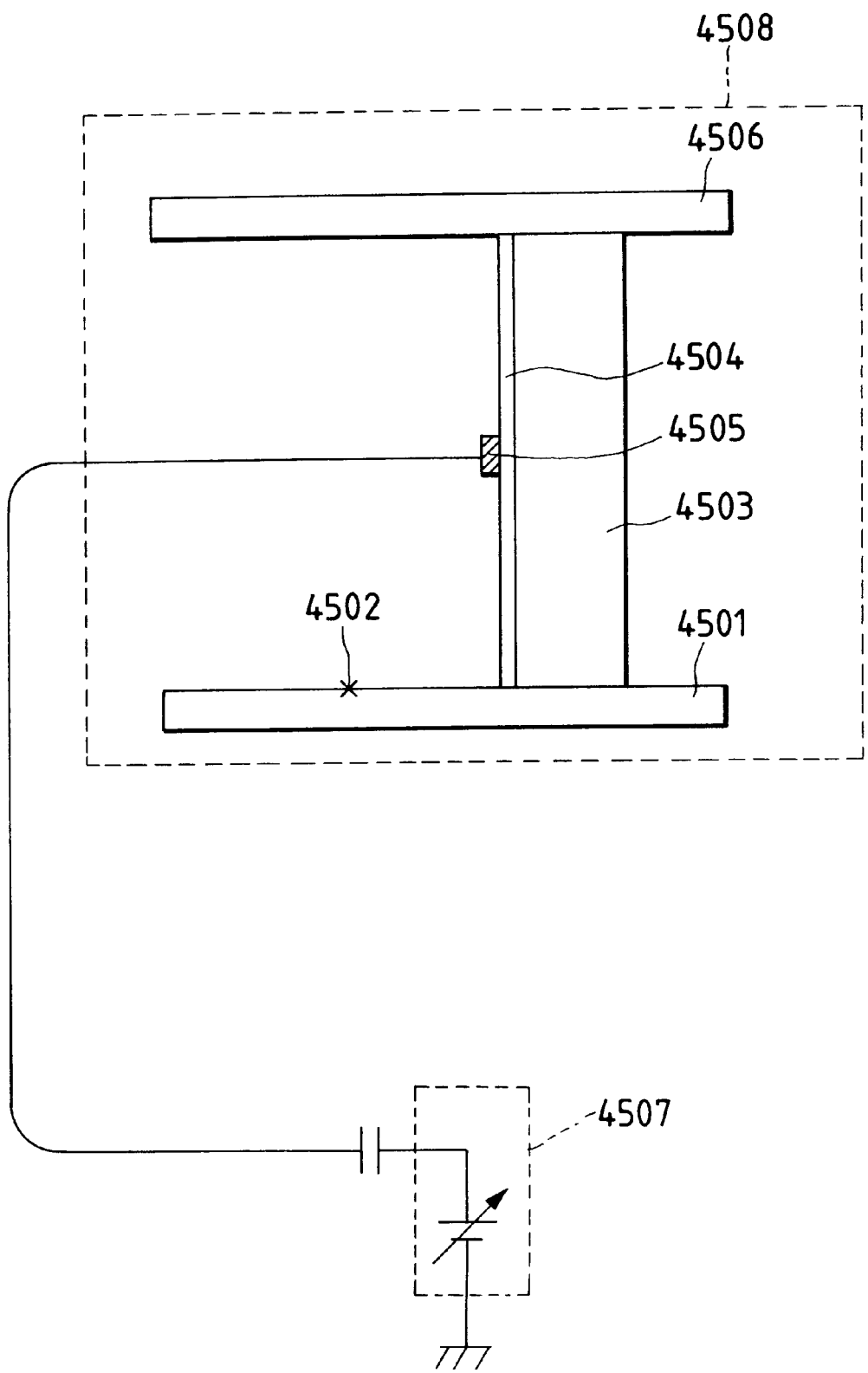
FIG. 28 is a schematic illustration of an arrangement for measuring potential fluctuations on the surface of a spacer for the purpose of the invention.

Now, a method that can be used for measuring the potential change on the spacer for equations (4) and (5) will be described by referring to FIGS. 28 and 29. Referring firstly to FIG. 28, an electron-emitting device 4502 is arranged on a substrate 4501 to emit electrons when a pulse voltage of about 10 V is applied thereto. There are also shown a spacer substrate 4503, a high resistance thin film 4504, a probe electrode 4505 for measuring the electric potential at a point of observation, an acceleration electrode 4506 to which an acceleration voltage $V_a$ of several kilovolts is applied, a vacuum chamber 4508 and a surface potentiometer 4507 which is connected to the probe electrode 4505 with a sufficiently high impedance provided therebetween so that the electric potential of the point of observation can be observed without disturbing the electric current flowing through the high resistance thin film 4504.

Figure 29:
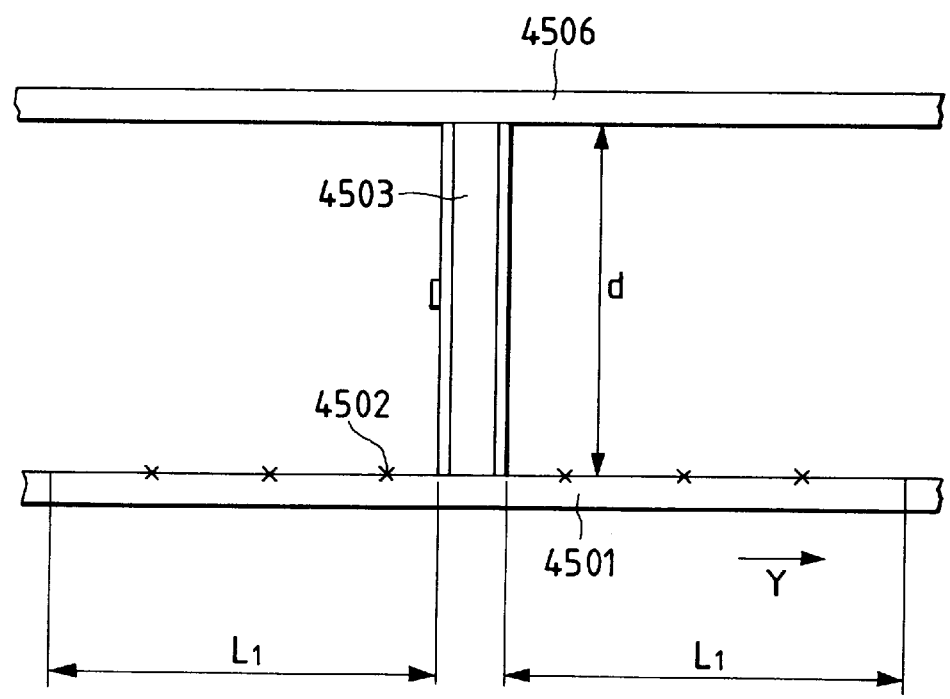
FIG. 29 is a schematic illustration of an alternative arrangement for measuring potential fluctuations on the surface of a spacer for the purpose of the invention.
Figure 30:
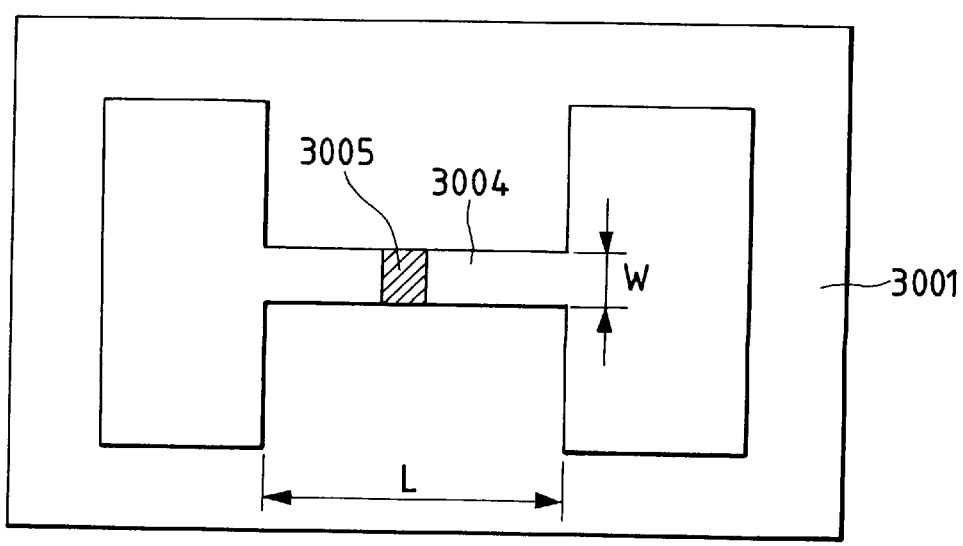
FIG. 30 is a schematic plan view of a known surface conduction electron-emitting device.
Figure 31:
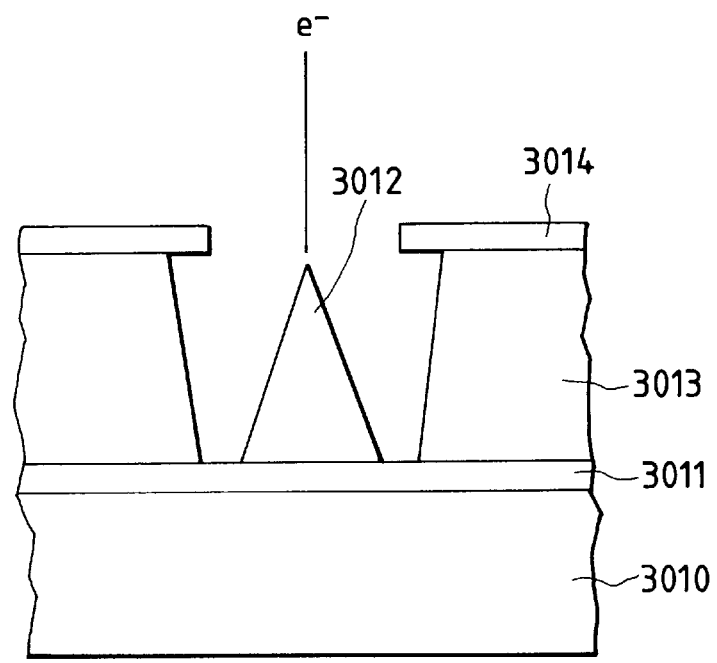
FIG. 31 is a schematic partial cross sectional side view of a known FE device.
Figure 32:
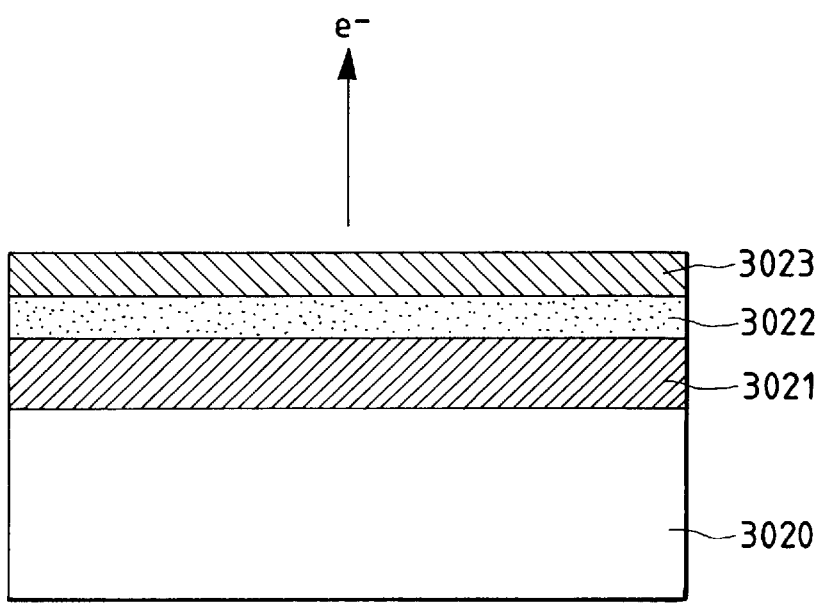
FIG. 32 is a schematic partial cross sectional side view of a known MIM device.

Referring now to FIG. 29, a number of electron-emitting devices are arranged along the X- and Y-axes (the X-axis being running perpendicularly relative to the surface of the drawing) and the spacers 4503 are arranged in parallel with the X-axis. The scanning line of the electron-emitting devices also runs in parallel with the X-axis.

In a measurement, the electron-emitting devices of lines up to $L_1=10d$ (d being the height of the spacers) were turned on simultaneously. Note that this turning-on condition is severer than the actual operating condition under which the display panel is driven by scanning rows of electron-emitting devices along the Y-axis on a line by line basis. The geometrical arrangement of the spacers and the electron-emitting devices, the acceleration voltage, the voltage applied to each of the electron-emitting devices and other factors were same as those used for driving the image-forming apparatus in actual use.

It should be noted, however, that the pulse width and the frame frequency were made greater and lower respectively than those selected for actual use in order to accurately determine the time constants and other factors by taking the S/N ratio and the band width of the measuring system into consideration. More specifically, the pulse width of the drive pulse was made greater because that the time constant for the electrically discharging phase does not depend on the level of electric charge and hence is not affected if a larger pulse width is used and that the accuracy of measurement can be improved by using a larger pulse width (and worsened if a smaller pulse width is used because then the electric potential shows only a small change). A frequency smaller than the actual frame frequency was selected because the measurement has to be conducted until the electric potential of the spacer falls to a sufficiently low level to accurately determine the time constant $\tau_d$ for the electrically discharging phase regardless of the time period for displaying a frame of an image.

The inventors of the present invention carried out a preliminary experiment, in which the relationship between the pulse width $\Delta t$ of the drive pulse and the time constant $\tau_d$ for the electrically discharging phase was looked into by varying the pulse width $\Delta t$ of the drive pulse within a range of less than 5 msec. As a result of the preliminary experiment, it was confirmed that the time constant $\tau_d$ for the electrically discharging phase remains constant if the pulse width of the drive pulse is varied (although it fluctuated when the pulse width was smaller than 500 $\mu$sec because the S/N ratio could not show a satisfactory value). As a result of this experiment, 1 msec was selected for $\Delta t$ for the evaluation of the performance of spacers.

Now, the present invention will be described in terms of preferred modes of carrying it out.

(Configuration of the Display Panel and Method of Manufacturing the Same)

Firstly, the configuration of the display panel of an image-forming apparatus according to the invention and a method of manufacturing it will be described in detail.

Figure 2:
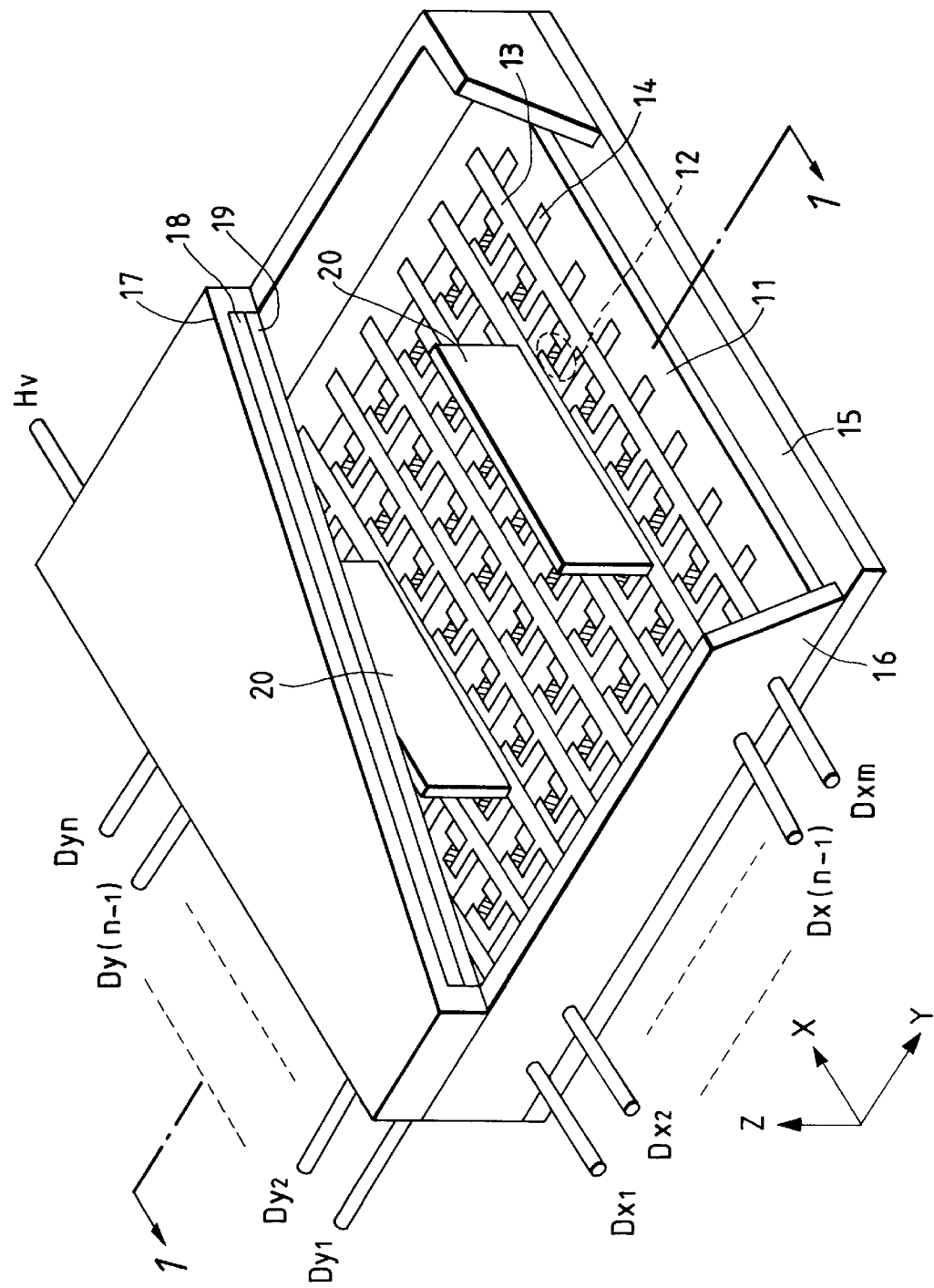
FIG. 2 is a partially cut away schematic perspective view of an image-forming apparatus according to the invention.

FIG. 2 is a schematic perspective view of the display panel of an image-forming apparatus according to the invention, which is partly cut away to show the inside. FIG. 1 is an enlarged schematic partial cross sectional view of the display panel of FIG. 2, showing a principal cross-sectional area along the line 1—1.

Figure 3:
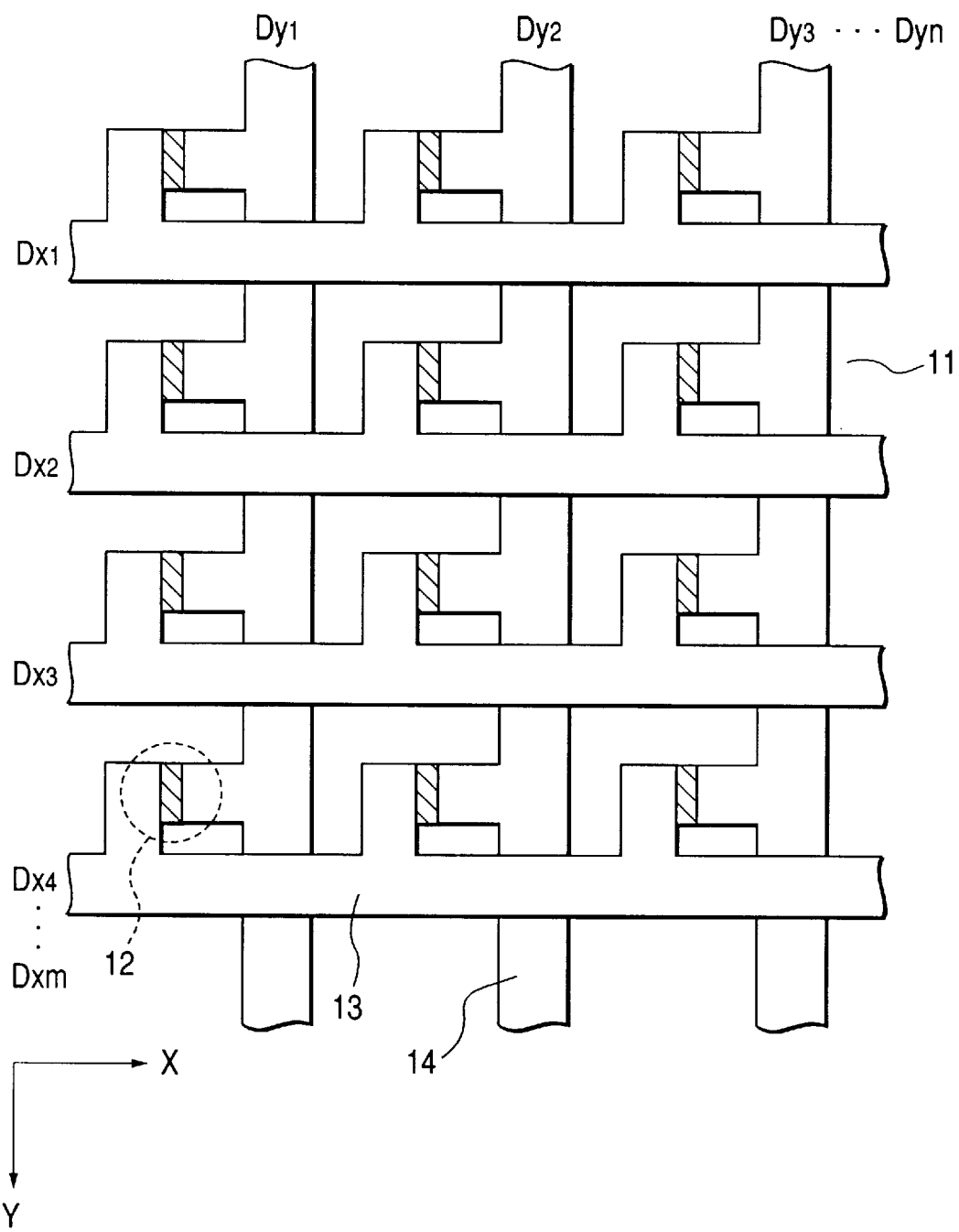
FIG. 3 is an enlarged schematic partial plan view of the electron source of the image-forming apparatus of FIG. 2, showing a principal area thereof.
Figure 4A:
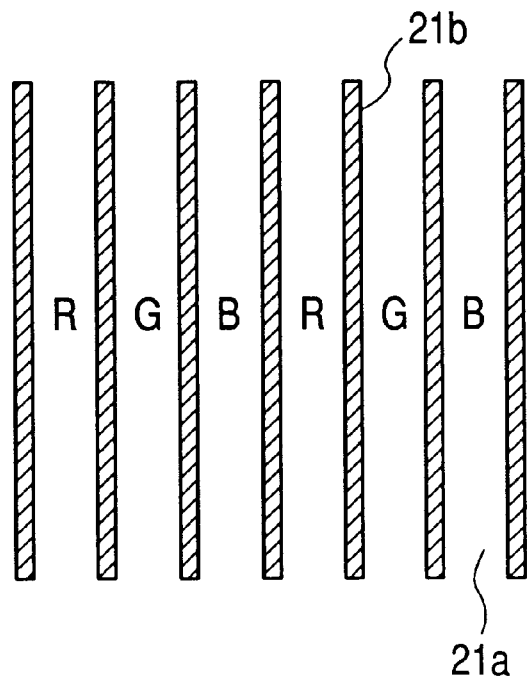
FIGS. 4A and 4B are schematic plan views of fluorescent films having different configurations that can be used for the purpose of the invention.
Figure 4B:
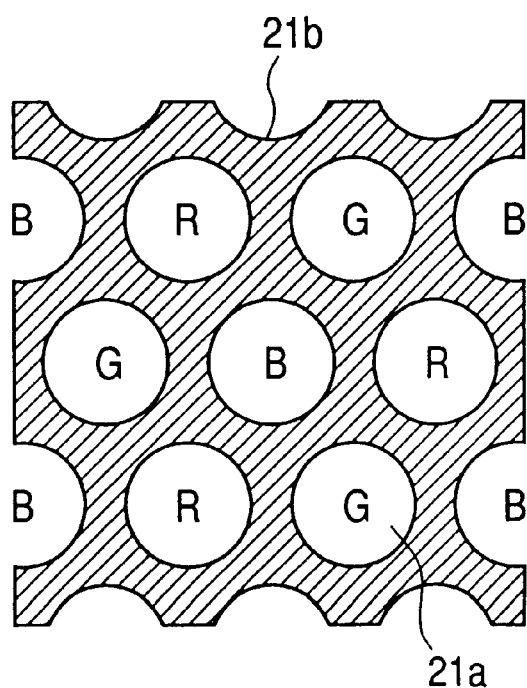

Referring to FIG. 2, an envelope (airtight container) is formed of a rear plate 15, side walls 16 and a face plate 17 to maintain the inside of the display panel under a vacuum condition. A substrate 11 is rigidly secured to the rear plate 15 and a total of N×M cold cathode devices are formed on the substrate 11 (N and M being integers not smaller than 2 selected depending on the number of display pixels used in the image-forming apparatus and preferably equal to or greater than 3,000 and 1,000 respectively when the apparatus is used for a high quality television set). The N×M cold cathode devices 12 are provided with a simple matrix wiring arrangement using M row-directional wires 13 and N column-directional wires 14 as shown in FIG. 3. The portion of the apparatus comprising the substrate 11, the cold cathode devices 12, the row-directional wires 13 and the column-directional wires 14 is referred to as a multi-electron-beam source. An insulation layer (not shown) is arranged between the row-directional wires 13 and the column-directional wires 14 at least at the crossings thereof in order to secure electric insulation between the two wire groups. While the substrate 11 of the multi-electron-beam source is secured to the rear plate 15 of the airtight container in the above description, the substrate 11 of the multi-electron-beam source itself may be used as the rear plate of the airtight container if it provides a sufficient strength to the container. Materials that can be used for the substrate 11 include quartz glass, glass containing impurities such as Na to a reduced concentration level, soda lime glass, glass substrate realized by forming an SiO$_2$ layer on soda lime glass by means of sputtering and ceramic substances such as alumina. The dimensions (size and thickness) of the substrate 11 are determined appropriately depending on the number and the profile of electron-emitting devices formed on the substrate 11 and the ability of withstanding the atmospheric pressure of the substrate 11 if it constitutes part (the rear plate) of the airtight container. The rear plate 15, the face plate 17 and the side walls 16 of the airtight container are preferably made of respective materials showing a satisfactory strength for the airtight container to withstand the atmospheric pressure applied to it and maintain the internal vacuum condition thereof and a high insulating ability for the container to withstand the high voltage applied between the multi-electron-beam source and the metal back of the container which will be described hereinafter. Materials that can be used for them also include quartz glass, glass containing impurities such as Na to a reduced concentration level, soda lime glass, and ceramic substances such as alumina. However, the material of the face plate 17 is required to show a transmissivity above a certain level relative to visible light. The materials of these components preferably have respective thermal expansion coefficients that are close to each other. The row- and column-directional wires 13 and 14 are made of an electrically conductive metal and formed on the substrate 11 to show a desired pattern by means of an appropriate technique such as vacuum evaporation, printing or sputtering. The material and the thickness and width of the wires are so selected that a predetermined voltage may be evenly and selectively applied to the large number of cold cathode devices 12 to drive them properly. The insulation layer arranged between the crossings of the row- and column-directional wires 13 and 14 is a layer typically made of SiO$_2$ and formed by means of an appropriate technique such as vapor evaporation, printing or sputtering. It may be formed either on the entire surface or on part of the surface of the substrate 11 after arranging the column-directional wires 14 on the substrate 11. The film thickness and the material of the insulation film and the technique to be used for forming it are selected appropriately to make it securely withstand the potential difference between the row-directional wires 13 and the column-directional wires 14 particularly at the crossings thereof. Preferred candidate materials of the row- and column-directional wires include metals such as Ni, Cr, Au, Mo, W, Pt, Ti, Al, Cu and Pd and their alloys, printable electrically conductive materials made of a metal or a metal oxide such as Pd, Ag, Au, RuO$_2$ and Pd-Ag and glass, transparent conducting materials such as In$_2$O$_3$-SnO$_2$ and semiconductor materials such as polysilicon. As shown in FIGS. 1 and 2, a fluorescent film 18 is formed under the face plate 17. Since the mode of carrying out the invention as described here is for displaying color images, the fluorescent film 18 actually comprises fluorescent bodies of primary colors of red (R), green (G) and blue (B). Referring to FIG. 4A, stripe-shaped fluorescent bodies 21a of the primary colors are arranged regularly with black conductive stripes 21b interposed therebetween. The black stripes 21b are provided in order to avoid color breakups on the displayed image if electron beams are deviated slightly from respective targets in the envelope, degradation of the contrast of the displayed image by preventing reflections of external light and charged up conditions of the fluorescent film due to electron beams. While graphite is normally used as principal ingredient of the black stripes, other conductive material having low light transmissivity and reflectivity may alternatively be used. The stripe-shaped fluorescent bodies of the primary colors shown in FIG. 4A may be replaced by deltas of fluorescent bodies of the primary colors as shown in FIG. 4B or some other arrangement. If the image-forming apparatus is designed for displaying monochromic images, the fluorescent film 18 is made of a monochromic fluorescent material as a matter of course. An ordinary metal back 19 is arranged on the inner surface of the fluorescent film 18, or the surface vis-a-vis the rear plate 15. The metal back 19 is provided in order to enhance the efficiency of the use of light of the apparatus by partly reflecting light emitted from the fluorescent film 18, protect the fluorescent film 18 against negative ions trying to collide with it, use the metal back itself for applying an electron beam-accelerating voltage and provide paths for conducting electrons that have been used for energizing the fluorescent film 18. It is prepared by smoothing the inner surface of the fluorescent film (in a process normally referred to as "filming") formed on the face plate 17 and forming an Al film thereon by vacuum evaporation. The metal back 19 is omitted when a fluorescent material adapted to low voltages is used for the fluorescent film 18. While not used in the above described mode of carrying out the invention, a transparent electrode typically made of ITO may be formed between the face plate 17 and the fluorescent film 18 in order to apply an acceleration voltage with ease and/or raise the conductivity of the fluorescent film 18.

In FIG. 2, Dx1 through Dx$m$, Dy1 through Dy$n$ and Hv denote airtight electric connection terminals for electrically connecting the display panel and an external electric circuit (not shown). Of these, the terminals Dx1 through Dxm are electrically connected to the respective row-directional wires 13 of the multi-electron-beam source, whereas the terminals Dy1 through Dy$n$ are electrically connected to the respective column-directional wires 14. The terminal Hv is electrically connected to the metal back 19. Additionally, spacers 20 are provided as anti-atmospheric-pressure structures for protecting the envelope against damages due to the atmospheric pressure and/or unexpected impacts in view of the fact that the envelope (airtight container) is internally held in vacuum to a degree of about $1.3 \times 10^{-4}$[Pa]. Each of the spacers 20 typically comprises an insulating member 20$a$ and an electrically highly resistive thin film 20$b$ formed on the surface of the insulating member 20$a$. Spacers 20 are arranged at regular intervals in the envelope to a number appropriate for achieving the above objective of protecting the envelope and firmly bonded to the inner surface of the envelope and the upper surface of the substrate 11 typically by means of frit glass. The high resistance thin film 20$b$ is electrically connected to the inside of the face plate 17 (the metal back 19 in particular) and the upper surface of the substrate 11 (the row-directional wires 13 and the column-directional wires 14 in particular). In the current mode of carrying out the invention, the spacers 20 are realized in the form of thin plates, which are arranged in parallel with and electrically connected to the row-directional wires 13.

The spacers 20 are required to show a degree of insulation that can withstand the high voltage applied between the row- and column-directional wires 13 and 14 on the substrate 11 and the metal back 19 on the inner surface of the face plate 17. Materials that can be used for the insulating member 20$a$ of the spacer include quartz glass, glass containing impurities such as Na to a reduced concentration level, soda lime glass and ceramic substances such as alumina. The insulating member 20$a$ preferably has a coefficient of thermal expansion close to those of the materials of the envelope (airtight container) and the substrate 11. The high resistance thin film 20$b$ may be made of highly grainy or noncrystalline film as described earlier by referring to the principle underlying the present invention that preferably has a surface resistance between $10^5$ and $10^{12}$[$\Omega/\square$] in order to provide a sustained effect of releasing electric charges and suppressing the power consumption level of leak currents. If the thin film 20$b$ is highly grainy, both the film thickness and the grain size are preferably between 10[nm] and 1[$\mu$m]. If the thin film 20$b$ is noncrystalline, on the other hand, the film thickness is also preferably between 10[nm] and 1[$\mu$m]. Any of the above listed materials can be used for the high resistance thin film 20$b$.

The high resistance thin film 20$b$ may be formed by means of an appropriate technique that will be selected according to the material of the thin film and the required productivity. Techniques that can be used for forming high resistance thin film 20$b$ include those involving the use of vacuum such as vacuum evaporation sputtering or chemical vapor phase deposition (CVD), on the surface of an insulating body through chemical reactions. The high resistance thin film 20$b$ is formed at least on the surface area of the insulating member 20$a$ exposed to vacuum in the envelope (airtight container). It is electrically connected to the black conductor 21$b$ or the metal back 19 on the face plate side 17 and to the row-directional wires 13 or the column-directional wires 14 on the rear plate side 15.

The spacers may have a profile other than the above described plate-like shape. For example, each spacer may be realized by combining a member running along the row-directional wires 13 and another member running along the column-directional wires 14 to show a sectional view of a "cross [+]". It may alternatively have a solid or hollow cylindrical profile if such a profile does not interfere with the courses of electron beams emitted within the envelope (airtight container).

For assembling an airtight container envelope for the purpose of the invention, the joint sections of the rear plate 15, the side walls 16 and the face plate 17 have to be provided with sufficient strength so that they may be bonded together to produce an airtight space in the inside. These components may be bonded together by applying frit glass to the joint sections of the components, assembling them together and baking them in ambient air or in a nitrogen atmosphere at temperature between 400° C. and 500° C. for more than 10 minutes. To produce a vacuum condition in the inside of the airtight container, the assembled airtight container is connected to an exhaust pipe and then to a vacuum pump and the inside of the airtight container is evacuated to a degree of vacuum of about $1.3 \times 10^{-5}$[Pa]. Thereafter, a piece of getter film (not shown) is formed at a predetermined position in the airtight container immediately before or after hermetically closing the exhaust pipe in order to maintain the above cited degree of vacuum within the airtight container. Getter film is formed by heating a getter material typically containing Ba as principal ingredient by means of a heater of high frequency heating until it is evaporated and deposited to make a film thereof. Due to the adsorption effect of the getter film, the inside of the airtight container is maintained typically to a degree of vacuum between $1.3 \times 10^{-3}$[Pa] to $1.3 \times 10^{-5}$[Pa].

Figure 5:
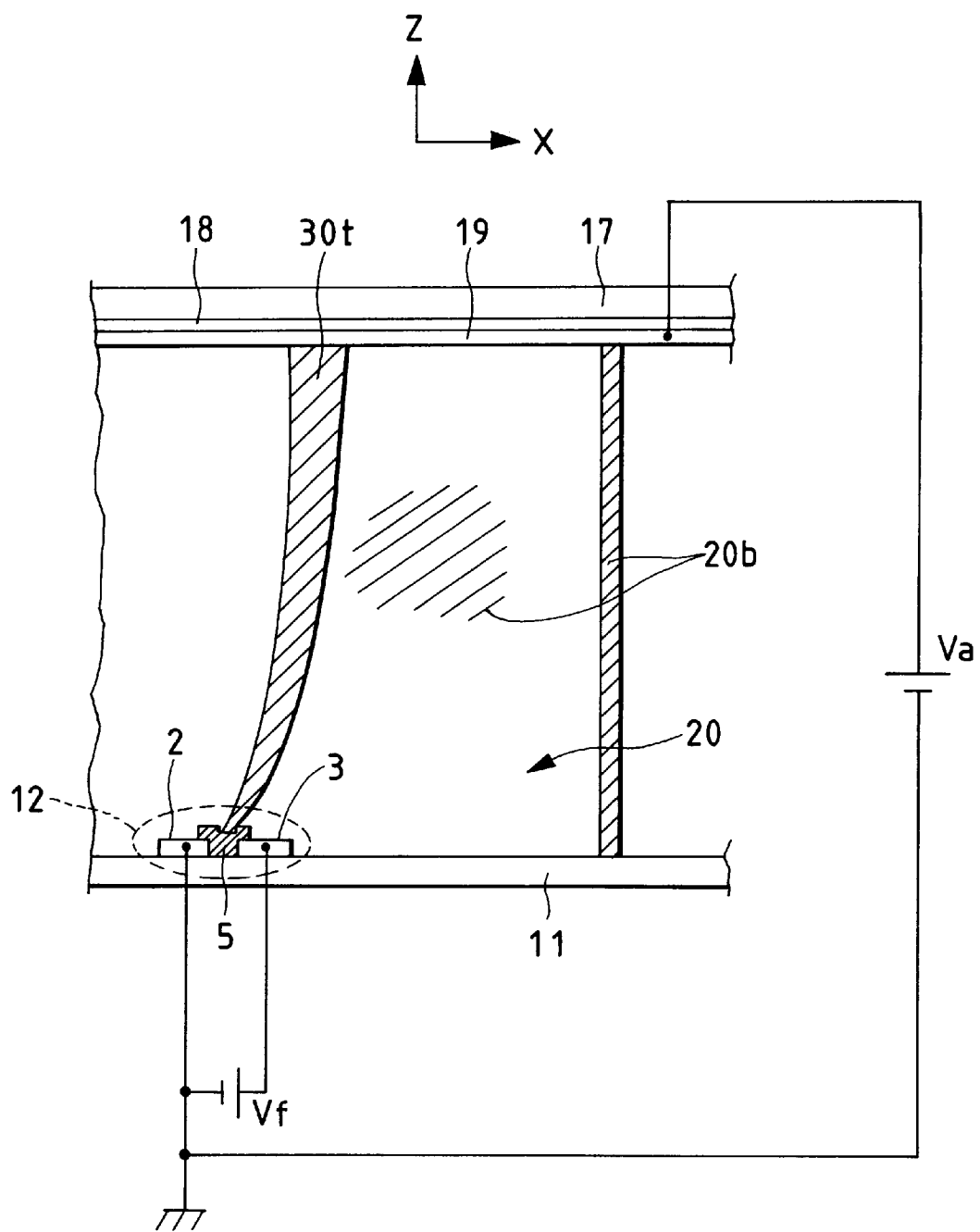
FIG. 5 is an enlarged schematic partial cross sectional view of the image-forming apparatus of FIG. 2 as viewed in the direction of the Y-axis, showing an electron-emitting region located close to a spacer to illustrate the trajectory of electrons and scattering charged particles.
Figure 6:
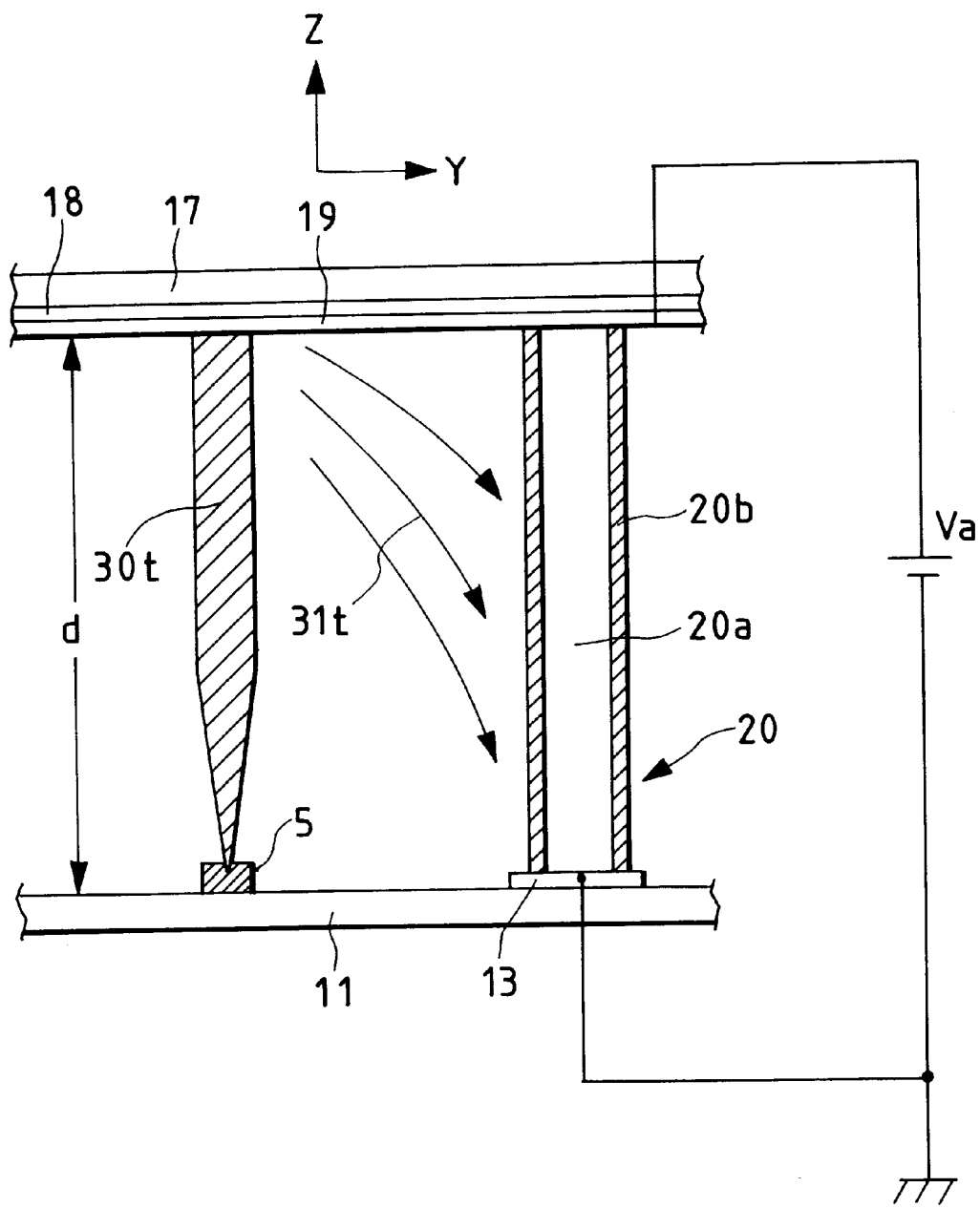
FIG. 6 is an enlarged schematic partial cross sectional view of the image-forming apparatus of FIG. 2 as viewed in the direction of the X-axis, showing an electron-emitting region located close to a spacer to illustrate the trajectory of electrons.

An image-forming apparatus comprising a display panel that is configured in a manner as described above emit electrons from the cold cathode devices 12 as a predetermined voltage is applied to the cold cathode devices 12 by way of the external terminals Dx1 through Dxm and Dy1 through Dy$n$. At the same time, a high voltage of several [kV] or more is applied to the metal back 19 (or the transparent electrode (not shown)) by way of the high voltage terminal Hv to accelerate emitted electrons to cause them vigorously collide with the inner surface of the face plate 17. As a result, the fluorescent bodies 21$a$ of the fluorescent film 18 are excited to emit light and display an image on the display screen. FIGS. 5 and 6 schematically illustrate this process, showing how electrons and scattering charged particles which will be described hereinafter are generated in the display panel of FIG. 2. FIG. 5 is an enlarged schematic partial cross sectional view of the image-forming apparatus of FIG. 2 as viewed in the direction of Y-axis, whereas FIG. 6 is a view similar to FIG. 5 but viewed in the direction of X-axis. Referring to FIG. 5, electrons emitted from the electron-emitting region of the cold cathode device 12 by applying voltage $V_f$ to the cold cathode device 12 are accelerated by acceleration voltage $V_a$ being applied to the metal back 19 on the face plate 17 and eventually collide with the fluorescent film 18 on the inner surface of the face plate 17 to cause the fluorescent film 18 to emit light. In the case of a cold cathode device such as a surface conduction electron-emitting device comprising an electron-emitting region arranged between a pair of electrodes, which are a high potential side electrode and a low potential side electrode, electrons are emitted from the electron-emitting region 5 to draw a parabolic trajectory as indicated by 30t that is deviated from the normal at the electron-emitting region 5 relative to the surface of the substrate 11 as shown in FIG. 5. Thus the center of the corresponding light emitting spot of the fluorescent film 18 is displaced from the normal at the electron-emitting region 5 relative to the surface of the substrate 11. Such an electron-emitting characteristic is presumably due to a potential distribution that is asymmetric relative to the electron-emitting region 5 as observed on planes parallel to the surface of the substrate 11. While most electrons emitted from the cold cathode device 12 will collide with the fluorescent film 18 on the inner surface of the face plate 17 to cause the film 18 to emit light and display images, there may be some that collide with other electrons or molecules of residual gas in the vacuum to give rise to scattering charged particles (ions, secondary electrons, neutral particles, etc.), which will by turn fly here and there in the envelope (airtight container) to typically show trajectories indicated by 31t in FIG. 6, although probability with which such collisions take place will be low. Additionally, there may be secondary electrons emitted from the surface of the high resistance thin film 20b when the thin film 20b is irradiated with electron beams. In a control experiment using an image-forming apparatus comprising a display panel as shown in FIG. 2 and spacers that are not coated with a high resistance thin film 20b, the inventors of the present invention discovered that light emitting spots on the fluorescent film 18 (where electrons collide with the fluorescent film 18) located close to the spacers 20 can show a contour that is deformed from the designed contour. Particularly, in the case where an image-forming member for displaying color images was used, reduced brightness and color break-ups could be observed in addition to displaced light emitting spots. The inventors presume that these phenomena are caused principally as some electrons and scattering charged particles collide with the surface of the insulating member 20a to produce secondary electrons and electrically charge the exposed surface of the insulating member 20a with such secondary electrons until the electric field at and near the exposed surface is modified to displace the courses of electrons and consequently produce deformed and/or displaced light emitting spots on some of the fluorescent bodies.

To the contrary, in an experiment using an image-forming apparatus comprising a display panel as shown in FIG. 2 and spacers that are coated with a high resistance thin film 20b as shown in FIG. 1, it was confirmed that the light emitting spots on the fluorescent 18 (where electrons collide with the fluorescent film 18) were located properly and showed a proper profile near the spacers 20 provided that the apparatus was configured appropriately and an appropriate image display frequency was selected as will be described in detail hereinafter. In other words, the courses of electron beams are not disturbed if the surface of the spacers 20 are electrically charged within a range defined by equations (8) and (15) as described earlier.

Note that the voltage $V_f$ applied between the paired device electrodes 2 and 3 of each of the cold cathode devices 12 (see FIGS. 9A and 9B) is between 12[V] and 16[V] and the distance separating the metal back 19 and the cold cathode devices 12 is between 2[mm] and 8[mm], while the voltage $V_a$ applied between the metal back 19 and each of the cold cathode devices 12 is between 1[kV] and 10[kV].

Now, spacers that can be used for an image-forming apparatus according to the invention will be described by referring to FIGS. 7A to 7C. Referring firstly to FIG. 7A, showing the profile of a preferred spacer that can be used for the purpose of the invention, it comprises an insulating member 20a providing the base of the spacer, a pair of electroconductive films 20c formed on the oppositely disposed surfaces of the spacer that abut respectively the electron accelerating electrode which may be the metal back 18 and the wires 13 and 14 and a high resistance thin film 20b formed on the surfaces of the spacer other than the abutting surfaces. Of the spacer having the above described configuration, the electroconductive film 20c formed on the abutting surfaces are electrically connected to the high resistance thin film 20b formed on the surfaces other than the abutting surfaces. Referring to FIG. 7B, showing the profile of another preferred spacer that can be used for the purpose of the invention, it also comprises an insulating member 20a providing the base of the spacer, a pair of electroconductive films 20c formed on the oppositely disposed surfaces of the spacer that abut respectively the electron accelerating electrode and the wires 13 and 14, the films covering some areas of the surfaces of the spacer other than the abutting surfaces including the edges bounding the abutting surfaces, and a high resistance thin film 20b formed on the surfaces of the spacer other than the abutting surfaces.

Of the spacer having the above described configuration, the pair of electroconductive films 20c formed on the oppositely disposed abutting surfaces and some areas of the surfaces of the spacer other than the abutting surfaces are electrically connected to the high resistance thin film 20b formed on the surfaces other than the abutting surfaces.

Referring finally to FIG. 7C showing the profile of still another preferred spacer that can be used for the purpose of the invention, it comprises an insulating member 20a providing the base of the spacer, a high resistance thin film 20b formed on the entire surface of the insulating member 20a and electroconductive thin films 20c formed on the oppositely disposed surfaces of the spacer that abut respectively the electron accelerating electrode and the wires 13 and 14. Of the spacer having the above described configuration, the electroconductive film 20c formed on the abutting surfaces are electrically connected to the high resistance thin film 20b formed on the surfaces other than the abutting surfaces. The high resistance thin film 20b formed on the surfaces of the insulating member 20a other than the abutting surfaces may be prepared in a manner as described above by referring to FIGS. 1, 5 and 6, taking the sustained effect of releasing electric charges and suppressing the power consumption level of leak currents into consideration. Therefore, the surface resistance (sheet resistance) and the material of the film and the method of forming the film are same as those described above.

Since the high resistance thin film 20b of any of the spacers 20 of FIGS. 7A to 7C is electrically connected to the electroconductive film 20c, the electric connection between the high resistance thin film 20b and the power feeding section of the image-forming apparatus can be secured if only part of the electroconductive film 20c is electrically connected to the power feeding section (e.g., the wires or the acceleration electrode).

FIG. 8 is an enlarged schematic cross sectional view of a spacer 20 used with abutments 40 having an electrically conductive member for the purpose of the invention. Referring to FIG. 8, there are shown a spacer 20, which may be of any of the above described types, abutments 40 having an electrically conductive member, a substrate 11 (of soda lime glass) on which typically row-directional wires 13 are arranged, a face plate 17, a fluorescent film 18, a metal back 19, a side wall 16 and frit glass 32. As will be described in greater detail hereinafter, each of the abutments 40 is fitted to the spacer in order to electrically connect it to the electron accelerating electrode (which may be the metal back) and the wires (which may be the row-directional wires or the column-directional wires) and also mechanically secure the spacer. Referring to FIG. 8, it is essential that the row-directional wires 13 on the substrate 11 and the electron accelerating electrode (the metal back 19) on the face plate are connected to the spacer 20 both electrically and mechanically by means of, for example, electrically conductive frit glass that typically contains electrically conductive fine particles.

Now, a cold cathode device to be used for the multi-electron-beam source of the display panel of an image-forming apparatus according to the invention will be described. Cold cathode devices to be used for the multi-electron-beam source of an image-forming apparatus according to the invention may be made of any material and have any profile if they are used with a simple matrix wiring arrangement in the multi-electron-beam source. In other words, the cold cathode devices may be surface conduction electron-emitting devices, FE type devices, MIM type devices or devices of some other type, although the use of surface conduction electron-emitting devices may be the best choice to provide a display apparatus having a large display screen at low cost. More specifically, as described earlier, FE type devices require highly precise manufacturing techniques because electron emitting performance of an FE type device is highly dependent on the relative positional relationship and the profiles of the conical emitter and the gate electrode, which is disadvantageous for producing a large display screen at reduced cost. In the case of using MIM type devices for a multi-electron-beam source, the insulation layers and the upper electrodes of the device have to be made very thin and uniform, which is also disadvantageous for producing a large display screen at low cost. On the other hand, surface conduction electron-emitting devices can be manufactured in a simple manner so that a large display screen can be produced with ease and at low cost. Additionally, to a great advantage of surface conduction electron-emitting devices, the inventors of the present invention discovered that devices comprising an electroconductive film including an electron-emitting region between a pair of device electrodes are particularly effective in emitting electrons and can be manufactured with ease. Such surface conduction electron-emitting devices are particularly suited for preparing a multi-electron-beam source for an image-forming apparatus having a large display screen that displays bright and clear images. Therefore, a surface conduction electron-emitting device that can be suitably used for the purpose of the invention will be described below in terms of basic configuration and manufacturing process.

(Preferable Configuration and Manufacturing Method of a Surface Conduction Electron-Emitting Device)

Two major types of surface conduction electron-emitting device comprising an electroconductive film of fine particles including an electron-emitting region and arranged between a pair of electrodes are the plane type and the step type.

(Plane Type Surface Conduction Electron-Emitting Device)

Firstly, a plane type surface conduction electron-emitting device will be described in terms of configuration and manufacturing method.

Figure 9A:
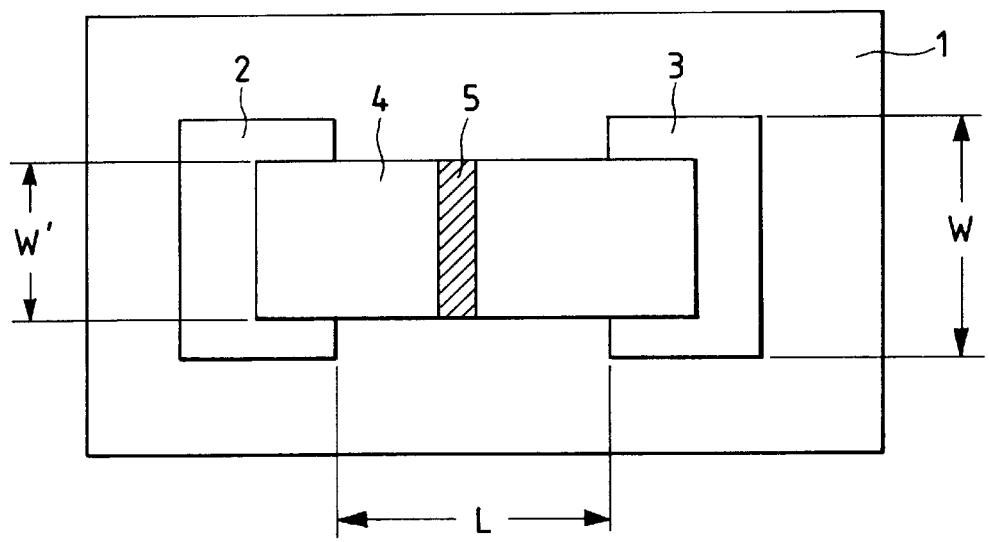
FIGS. 9A and 9B are a plan view and a cross sectional side view, schematically showing a surface conduction electron-emitting device that can be used for the purpose of the present invention.
Figure 9B:
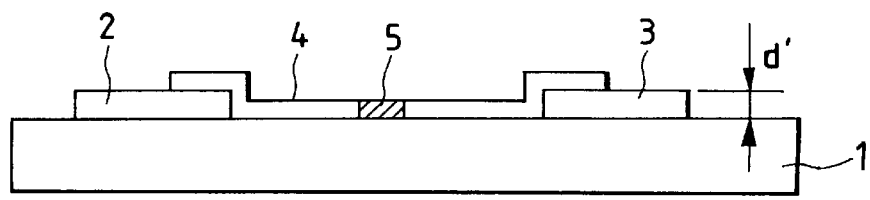

FIGS. 9A and 9B are schematic views showing a plane type surface conduction electron-emitting device according to the invention, of which FIG. 9A is a plan view and FIG. 9B is a sectional side view. Referring to FIGS. 9A and 9B, the device comprises a substrate 1, a pair of device electrodes 2 and 3, an electroconductive film 4 and an electron-emitting region 5 formed by means of a forming process that typically involves energization forming.

The substrate 1 may be a glass substrate of quartz glass, soda lime glass or some other glass, a ceramic glass of alumina or some other ceramic substance or a substrate obtained by layering an insulation layer of $SiO_2$ on any of the above listed substrates.

Figure 10A:
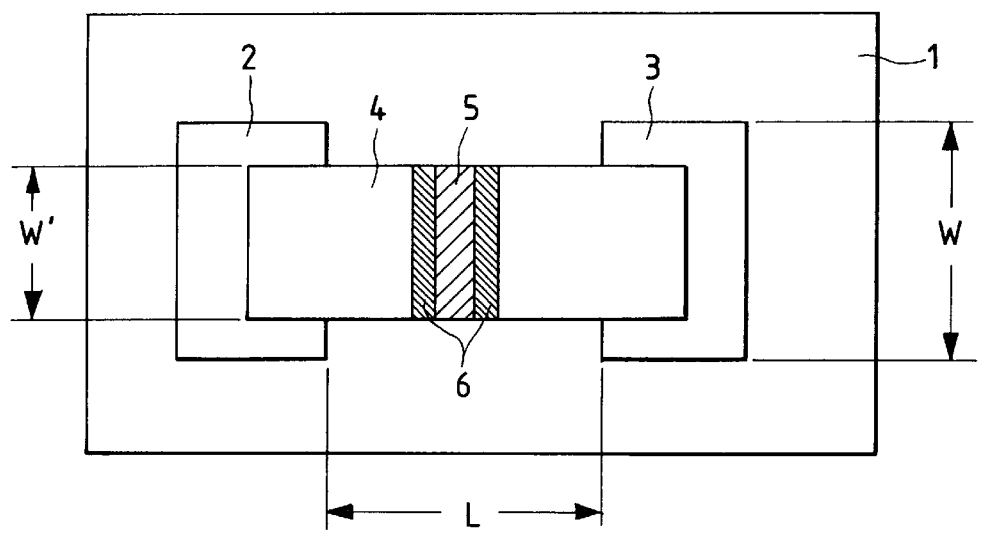
FIGS. 10A and 10B are a schematic plan view and a schematic cross sectional side view of an alternative surface conduction electron-emitting device that can be used for the purpose of the present invention.

While the device electrodes 2 and 3 that are arranged oppositely and in parallel with the substrate may be made of any highly conducting material, preferred candidate materials include metals such as Ni, Cr, Au, Mo, W, Pt, Ti, Al, Cu and Pd and their alloys, printable conducting materials made of a metal or a metal oxide selected from Pd, Ag, $RuO_2$, Pd-Ag and glass, transparent conducting materials such as $In_2O_3$—$SnO_2$ and semiconductor materials such as polysilicon. The electrodes can be formed without difficulty by way of a combined use of a film forming technique such as vacuum evaporation and a patterning technique such as photolithography or etching, although other techniques (e.g., printing) may alternatively be used. The device electrodes 2 and 3 may have an appropriate profile depending on the application of the device. Generally, the distance L separating the device electrodes 2 and 3 is between tens of several nanometers and hundreds micrometers and preferably between several micrometers and tens of several micrometers depending on the voltage to be applied to the device electrodes and the field strength available for electron emission. The film thickness d' of the device electrodes 2 and 3 is between tens of several nanometers and several micrometers. The electroconductive film 4 is preferably a film containing a large number of fine particles (including island-like agglomerates) in order to provide excellent electron-emitting characteristics. When observed microscopically, a fine particle film that can be used for the purpose of the invention contains a large number of fine particles that may be loosely dispersed, tightly arranged or mutually and randomly overlapping. The diameter of fine particles to be used for the purpose of the present invention is between a tenth of a nanometer and hundreds of several nanometers and preferably between a nanometer and twenty nanometers. The thickness of the electroconductive film 4 is determined as a function of various factors as will be described in greater detail hereinafter, which include the conditions for establishing a good electric connection with the device electrodes 2 and 3, those for carrying out an energization forming process successfully and those for obtaining an appropriate value for the electric resistance of the fine particle film itself. Specifically, it is between a tenth of a nanometer and hundreds of several nanometers and preferably between a nanometer and fifty nanometers. The electroconductive film 4 is made of fine particles of a material selected from metals such as Pd, Ru, Ag, Au, Ti, In, Cu, Cr, Fe, Zn, Sn, Ta, W and Pb, oxides such as PdO, $SnO_2$, $In_2O_3$, PbO and $Sb_2O_3$, borides such as $HfB_2$, $ZrB_2$, $LaB_6$, $CeB_6$, $YB_4$ and $GdB_4$, carbides such TiC, ZrC, HfC, TaC, SiC and WC, nitrides such as TiN, ZrN and HfN, semiconductors such as Si and Ge and carbon. The electroconductive film 4 normally shows a sheet resistance between $10^3$ and $10^7[\Omega/\square]$. Note that the electroconductive film 4 and the device electrodes 2 and 3 are arranged to realize a stepped coverage relative to each other. While the device electrodes 2 and 3 are arranged on the substrate 1 and then the electroconductive film 4 is laid to partly cover the device electrode 2 and 3 in FIGS. 9A and 9B, if desired, the device electrodes may alternatively be laid on the electroconductive film. The electron-emitting region 5 is part of the electroconductive film 4 and comprises one or more than one an electrically highly resistive gaps, which may typically be fissures that are produced as a result of an energization process, which will be described hereinafter. The fissure may contain fine particles with a diameter between a tenth of a nanometer and tens of several nanometers. FIGS. 9A and 9B show the electron-emitting region 5 only schematically because there is no way for exactly knowing the location and the profile of the electron-emitting region 5. As shown in FIGS. 10A (plan view) and 10B (sectional side view), the electron-emitting region 5 may have a thin film 6 formed on each side thereof, which is a carbon or carbon compound film produced as a result of an energization activation process conducted after an energization forming process as will be described in greater detail hereinafter. The thin film 6 is made of monocrystalline graphite, polycrystalline graphite, noncrystalline carbon or a combination of any of them. The thickness of the thin film 6 is less than 50[nm] and preferably less than 30[nm]. Again, the thin films 6 are illustrated only schematically in FIGS. 10A and 10B because there is no way for exactly known the locations and the profiles thereof.

Now, a method of manufacturing a plane type surface conduction electron-emitting device that can suitably be used for the purpose of the invention will be described by referring to FIGS. 11A to 11D, which show schematic sectional side views of a surface conduction electron-emitting device in different steps. The components of the device are denoted respectively by reference numerals same as those of FIGS. 9A, 9B, 10A and 10B.

1) After thoroughly cleansing a substrate 1 with detergent and pure water, the material of a pair of device electrodes are deposited on the substrate 1 by deposition.

Figure 11A:
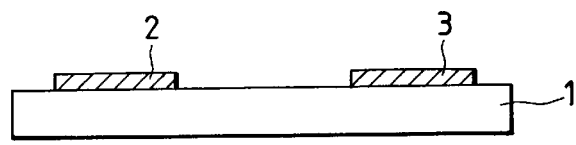
FIGS. 11A, 11B, 11C, 11D and 11E are schematic cross sectional side views of a surface conduction electron-emitting device that can be used for the purpose of the present invention, showing different manufacturing steps thereof.

The material can be deposited by evaporation, sputtering or some other film forming technique using vacuum. Thereafter, a pair of device electrodes 2 and 3 are produced by patterning involving the use of the technique of photolithography and etching as shown in FIG. 11A.

Figure 11B:
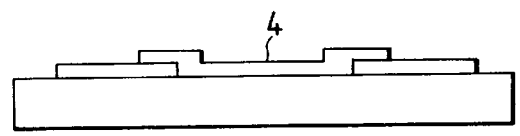

2) Then, as shown in FIG. 11B, an electroconductive film 4 is formed on the substrate 1. More specifically, a fine particle film is formed by applying an organic metal solution on the substrate, drying it and thereafter baking it. Then, the film is made to show a desired pattern by photolithogrpahy and etching. The organic metal solution may contain as principal ingredient any of the metals listed above for the electroconductive film 4. Pd was used as principal ingredient in the examples described hereinafter. While the organic metal solution was applied by dipping, some other technique such as the one using a spinner or a sprayer may alternatively be used. An electroconductive film of fine particles may be formed by means of vacuum evaporation, sputtering or chemical vapor phase deposition in place of the above described application of the organic metal solution.

Figure 12:
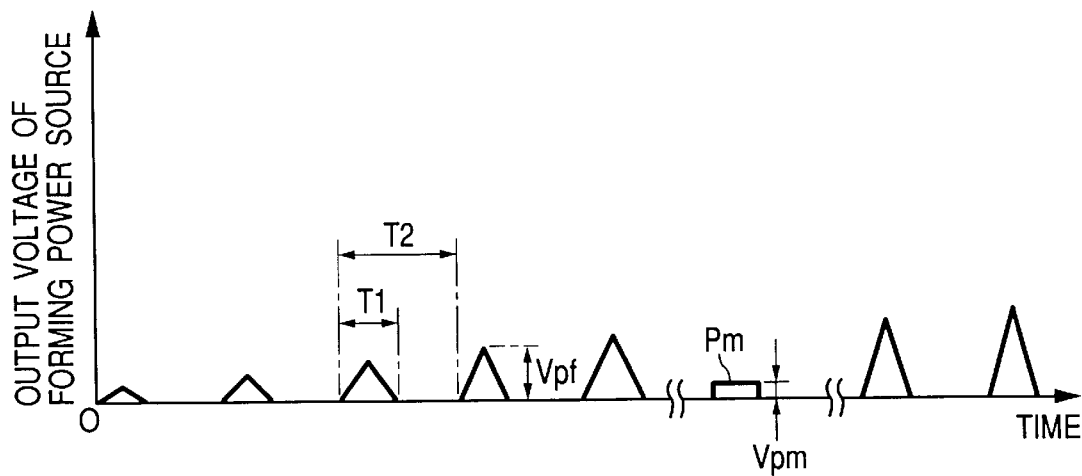
FIG. 12 is a graph showing a voltage waveform to be used for an energization forming process for the purpose of the present invention.

3) Thereafter, the device electrodes 2 and 3 are subjected to an energization forming process, where an appropriate voltage is applied between the device electrodes 2 and 3 from a forming power source 22 to produce an electron-emitting region 5. In the energization forming process, the electroconductive film 4 made of fine particle film is electrically energized and locally destroyed, deformed or transformed to produce an area having a structure adapted to emit electrons. The area forced to show a structure adapted to emit electrons (or the electron-emitting region 5) has one or more than one fissures in the thin film. Note that the electric resistance between the device electrodes 2 and 3 dramatically rises once an electron-emitting region 5 is produced in the electroconductive film. FIG. 12 shows the waveform of a voltage that can suitably be applied to the device electrodes from a forming power source 22 for energization forming for the purpose of the invention. A pulse voltage is advantageously be used for the process of energization forming to be conducted on an electroconductive film that is made of fine particle film. In the examples as will be described hereinafter, a triangular pulse voltage having a pulse width T1 as shown in FIG. 12 was applied with a pulse interval T2 in the course of manufacturing a surface conduction electron-emitting device. The height Vpf of the triangular pulse voltage was gradually raised. A monitoring pulse Pm was inserted into the triangular pulse at appropriate regular intervals and the electric current was observed by means of an ammeter 23 in order to monitor the progress in the formation of the electron-emitting region 5. In the examples as will be described hereinafter, the pulse voltage T1 and the pulse interval T2 were 1[msec] and 10[msec], whereas the pulse wave height Vpf was raised by 0.1[V] by each pulse. The monitoring pulse Pm was inserted at every five pulses of the triangular wave. No adverse effect of the monitoring pulse was observed in the process of energization forming. The voltage of the monitoring pulse Vpm was 1.0[V]. The electric energization for the energization forming process was terminated when the electric resistance between the device electrodes 2 and 3 rose to $1\times10^6[\Omega]$ or the current observed on the ammeter 23 fell below $1\times10^{-7}[A]$ while the monitoring pulse was being applied. While preferable energization forming procedures are described above for a surface conduction electron-emitting device, the conditions for energization forming may preferably be modified appropriately when the material and the film thickness of the fine particle film, the distance between the device electrodes and/or other elements of the surface conduction electron-emitting device are changed.

Figure 10B:
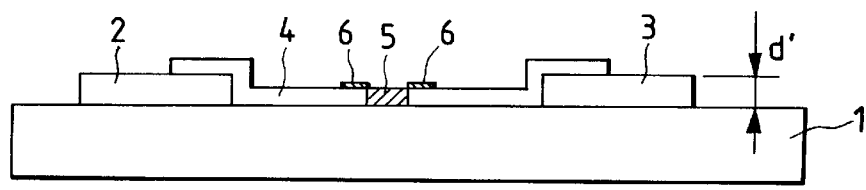
Figure 11C:
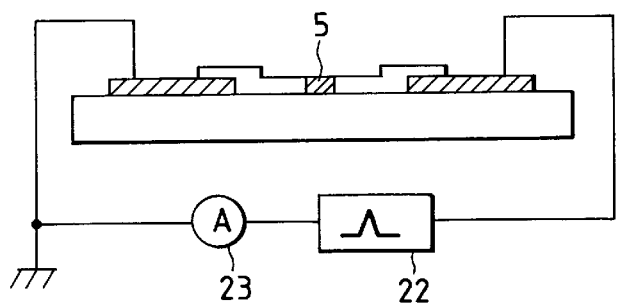
Figure 11D:
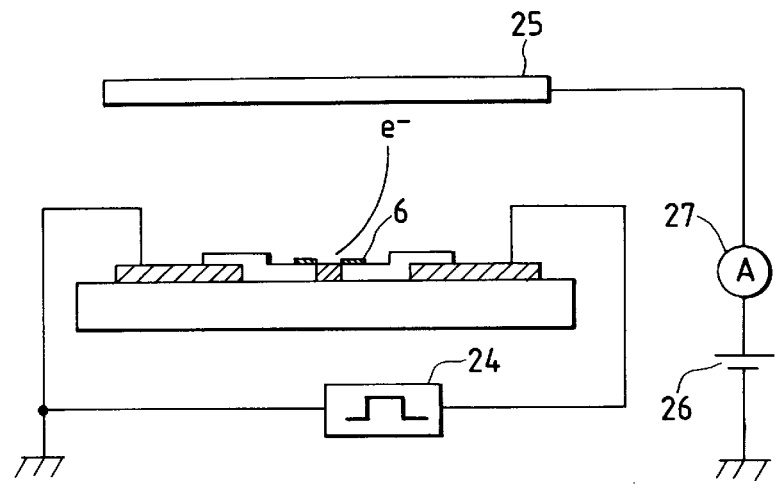
Figure 11E:
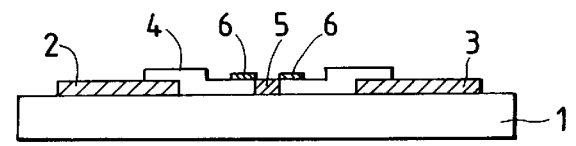
Figure 13A:
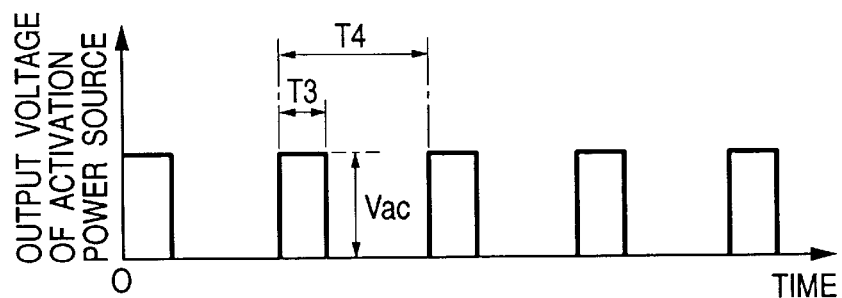
FIGS. 13A and 13B are respectively a graph showing a voltage waveform to be used for an activation process and a graph showing the emission current of a surface conduction electron-emitting device that can be used for the purpose of the present invention.

4) After the energization forming operation, the device is subjected to an activation process as referred to above by referring to FIGS. 10A and 10B. Referring to FIG. 11D, the activation process is a process in which the electron-emitting region 5 produced by the energization forming process is electrically energized for energization-activation by applying an appropriate voltage between the device electrodes from an activation power source 24 in order to deposit carbon or a carbon compound on it and its vicinity. In FIGS. 11D and 11E, there are schematically shown a pair of deposits of carbon or a carbon compound that are indicated by reference numeral 6. As a result of an energization-activation process, the emission current of the device is typically raised by more than 100 times for a same voltage applied thereto if compared with the emission current of the device before the energization-activation process. More specifically, in an activation process, a pulse voltage may be periodically applied to the device in vacuum of a degree of $1.3 \times 10^{-2}$[Pa] to $1.3 \times 10^{-3}$[Pa] in order to deposit carbon or a carbon compound originating from the organic compounds remaining in the vacuum. The deposits 6 are those of monocrystalline graphite, polycrystalline graphite, noncrystalline carbon or a mixture of any of them and have a film thickness less than 50[nm] and preferably less than 30[nm]. FIG. 13A shows the waveform of a pulse voltage that can be applied to a surface conduction electron-emitting device from the activation power source 24 for the purpose of the invention. In the examples of manufacturing a surface conduction electron-emitting device as will be described hereinafter, a rectangular pulse voltage having a constant pulse wave height was used for the energization-activation process. The pulse wave height $V_{ac}$, the pulse width T3 and the pulse interval T4 of the rectangular pulse voltage were respectively 14[V], 1[msec] and 10[msec]. While the above figures of pulse voltage are selected for manufacturing a surface conduction electron-emitting device in the current mode of manufacturing carrying out the invention, a different set of figures will have to be selected for manufacturing a surface conduction electron-emitting device having a different configuration. In FIG. 11D, a DC high voltage power source 26 and an ammeter 72 are connected to the anode 25 for supplementing the emission current $I_e$ emitted from the surface conduction electron-emitting device. If the activation process is carried out after installing the substrate 1 in the display panel, the fluorescent plane of the display panel is used as anode 25. When a voltage is applied to the device from the activation power source 24, the progress of the energization-activation process is monitored by observing the emission current $I_e$ by means of the ammeter 27 to control the operation of the activation power source 24.

Figure 13B:
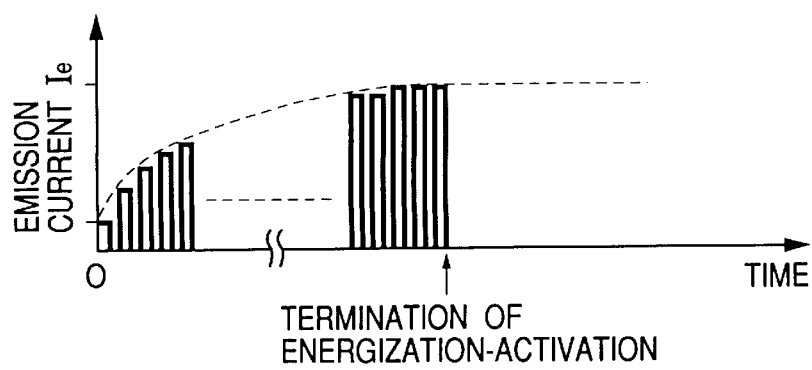

FIG. 13B shows the emission current $I_e$ observed by means of the ammeter 27. As a pulse voltage is applied to the device from the activation power source 24, the emission current $I_e$ rises with time until it gets to a saturation point, after which the emission current substantially remains on a constant level. The energization-activation process is terminated by suspending the voltage application from the activation power source 24 when the emission current $I_e$ gets to the saturation point. Note again, while the above figures of pulse voltage are selected for manufacturing a surface conduction electron-emitting device in the current mode of manufacturing carrying out the invention, a different set of figures will have to be selected for manufacturing a surface conduction electron-emitting device having a different configuration.

Thus, in this way, a plane type surface conduction electron-emitting device having a configuration as shown in FIG. 11E is produced.

(Step Type Surface Conduction Electron-Emitting Device)

Now, a step type surface conduction electron-emitting device will be described in terms of configuration and manufacturing method.

Figure 14:
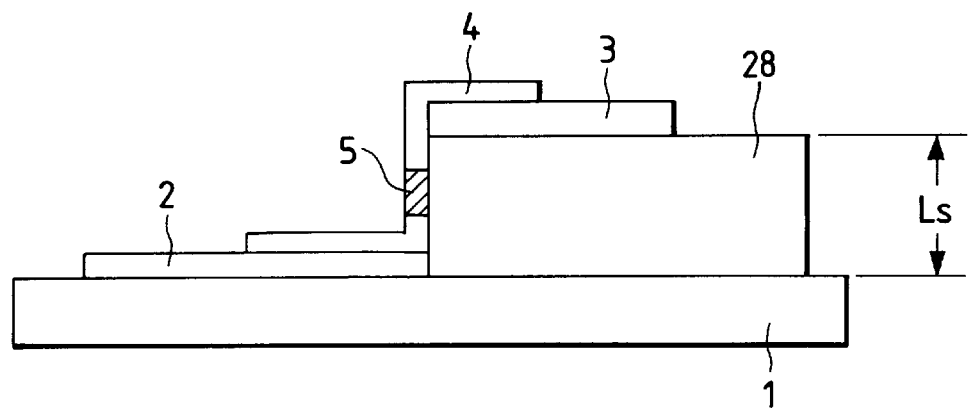
FIG. 14 is a schematic cross sectional side view of a step-type surface conduction electron-emitting device that can be used for the purpose of the present invention.
Figure 15:
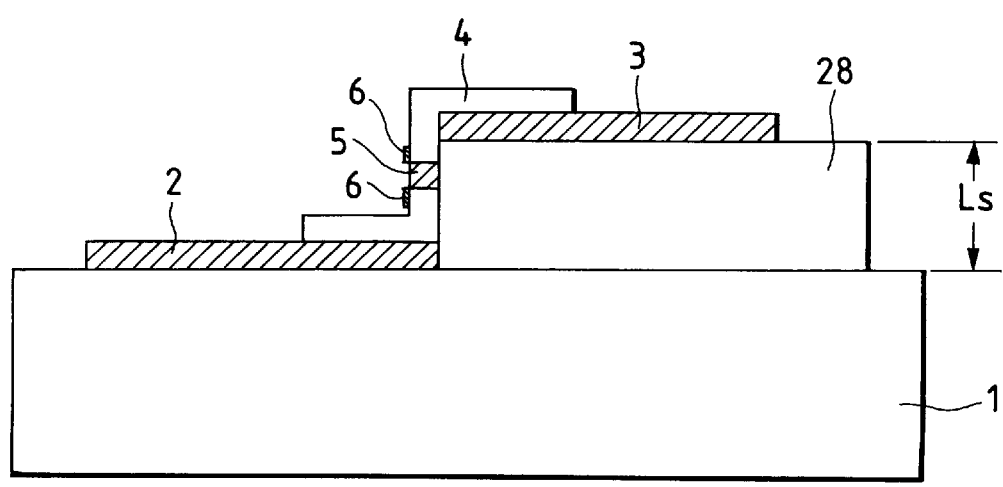
FIG. 15 is a schematic cross sectional side view of an alternative step-type surface conduction electron-emitting device that can be used for the purpose of the present invention.

FIGS. 14 and 15 are schematic sectional side views of a step type surface conduction electron-emitting device according to the invention, showing its basic configuration. Referring to FIGS. 14 and 15, it comprises a substrate 1, a pair of device electrodes 2 and 3, a step-forming section 28, an electroconductive film 4 and an electron-emitting region 5 formed by means of an energization forming process. Reference numeral 6 in FIG. 15 denotes thin films formed as a result of an energization-activation process. This step type surface conduction electron-emitting device differs from the above described plane type surface conduction electron-emitting device in that one of the device electrodes, or electrode 3, is arranged on the step-forming section 28 and the electroconductive film 4 covers a lateral surface of the step-forming section 28. Thus, the height Ls of the step-forming section 28 of this step type surface conduction electron-emitting device corresponds to the distance L between the device electrodes 2 and 3 of the plane type surface conduction electron-emitting device. The substrate 1, the device electrodes 2 and 3 and the electroconductive film 4 comprising fine particle film of a step type surface conduction electron-emitting device may be made of any of the materials respectively listed earlier for their counterparts of a plane type surface conduction electron-emitting device. The step-forming section 28 is typically made of an electrically insulating material such as $SiO_2$.

Now, a method of manufacturing a step type surface conduction electron-emitting device will be described by referring to FIGS. 16A to 16F, showing cross sectional side views of a step type surface conduction electron-emitting device in different manufacturing steps. The components of the device are denoted respectively by reference numerals same as those of FIGS. 14 and 15.

Figure 16A:
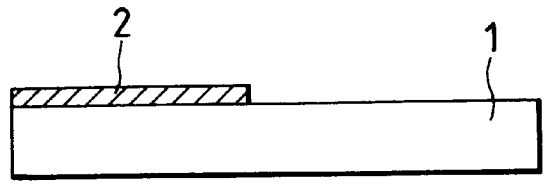
FIGS. 16A, 16B, 16C, 16D, 16E and 16F are schematic cross sectional side views of a step-type surface conduction electron-emitting device that can be used for the purpose of the present invention, showing different manufacturing steps thereof.

1) Firstly, a device electrodes, or electrode 2, is formed on a substrate 1 as shown in FIG. 16A.

Figure 16B:
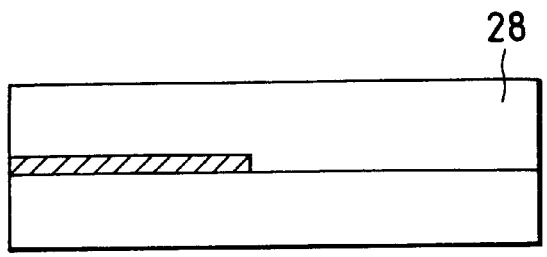

2) Secondly, in insulation layer 28 is laid thereon to form a step-forming section as shown in FIG. 16B.

Figure 16C:
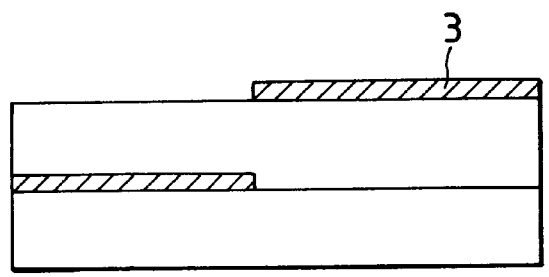

3) Then, another device electrode, or electrode 3, is formed on the insulation layer 28 as shown in FIG. 16C.

Figure 16D:
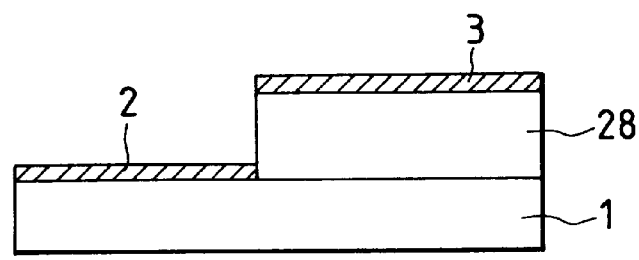

4) Thereafter, the insulation layer 28 is partly removed by etching to expose the device electrode 2 as shown in FIG. 16D.

Figure 16E:
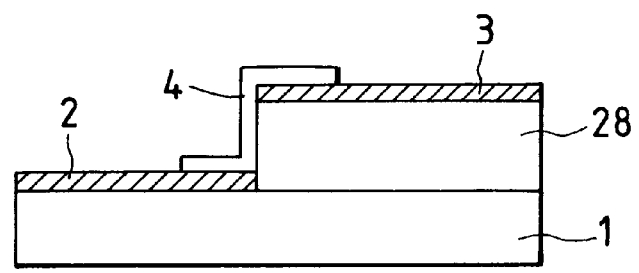

5) Then, an electroconductive film 4 formed by using fine particle film as shown in FIG. 16E. The electroconductive film 4 may be produced by means of an appropriate film forming technique such as the application technique as in the case of a plane type surface conduction electron-emitting device.

6) Subsequently, an electron-emitting region 5 is formed in the electroconductive film 4 by energization forming as in the case of a plane type surface conduction electron-emitting device. An energization forming process as described above for a plane type device by referring to FIG. 11C is also applicable to a step type device.

7) Then, as in the case of a plane type device, carbon or a carbon compound may be deposited on and near the electron-emitting region by energization-activation. An energization-activation process as described above for a plane type device by referring to FIG. 11D is also applicable to a step type surface conduction electron-emitting device.

Figure 16F:
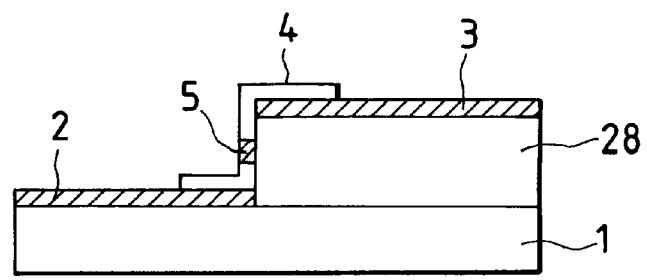

In this way, a step type surface conduction electron-emitting device having a configuration as shown in FIG. 16F is produced.

(Characteristics of a Surface-Conduction Electron-Emitting Device Used in a Display Apparatus)

A plane or step type surface conduction electron-emitting device prepared in a manner as described above shows the following characteristic features.

Figure 17:
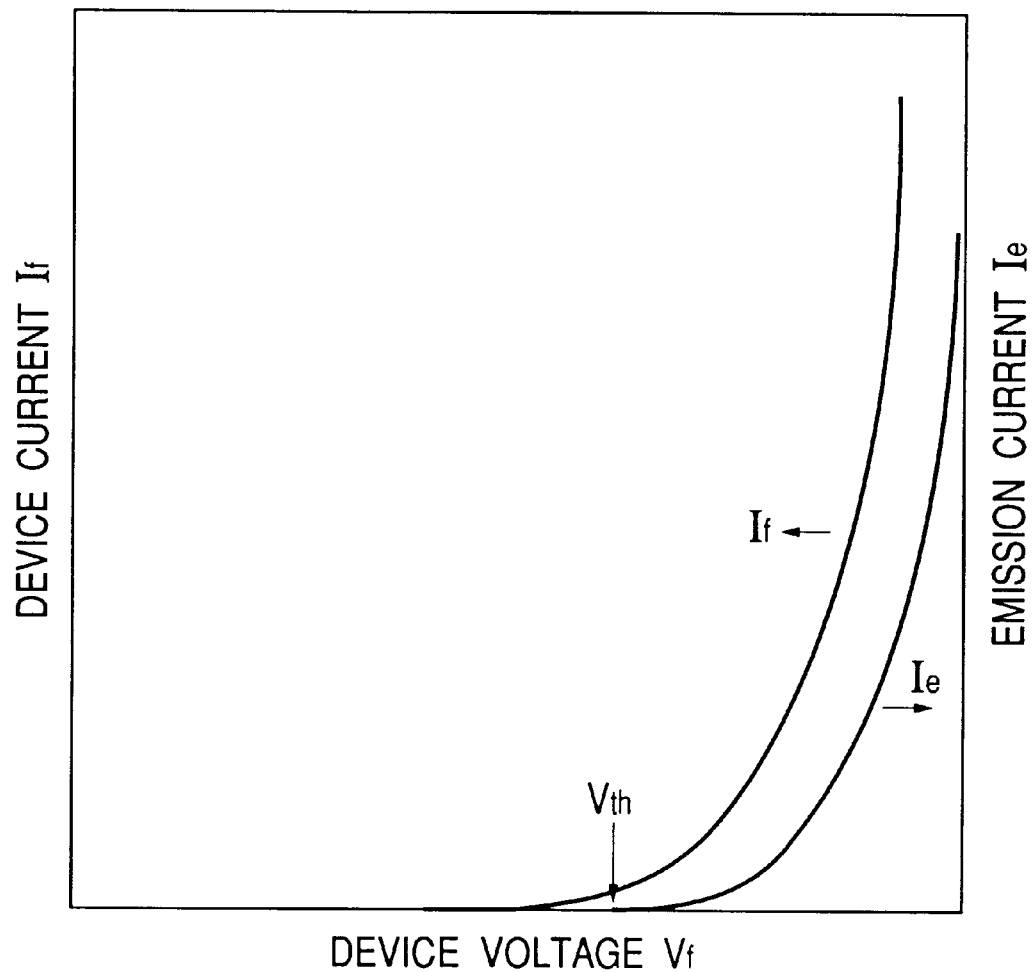
FIG. 17 is a graph showing the relationship of the device current, the emission current and the device voltage of a surface conduction electron-emitting device that can be used for the purpose of the present invention, showing its basic electric properties.

FIG. 17 shows a graph schematically illustrating the relationship of the device voltage $V_f$ and the emission current $I_e$. and that of the device voltage $V_f$ and the device current $I_f$. Note that different units are arbitrarily selected for the emission current $I_e$ and the device current $I_f$ in FIG. 17 in view of the fact that the emission current $I_e$ has a magnitude by far smaller than that of the device current $I_f$ so that a same scale cannot be used for them and that the relationships can vary significantly depending on the profile of the device and the design parameters.

An electron-emitting device to be used for an image-forming apparatus according to the invention has three remarkable characteristic features in terms of emission current $I_e$, which will be described below.

Firstly, the electron-emitting device shows a sudden and sharp increase in the emission current $I_e$ when the voltage applied thereto exceeds a certain level (which is referred to as a threshold voltage $V_{th}$ hereinafter), whereas the emission current $I_e$ is practically undetectable when the applied voltage is found lower than the threshold value $V_{th}$. Differently stated, the electron-emitting device is a non-linear device having a clear threshold voltage $V_{th}$ relative to the emission current $I_e$. Secondly, since the emission current $I_e$ varies depending on the device voltage $V_f$, the former can be effectively controlled by way of the latter. Thirdly, the electric charges of electrons emitted from the device can be controlled captured by controlling the time during which the device voltage $V_f$ is applied because the emission current $I_e$ quickly responses to the device voltage $V_f$.

Because of the above remarkable characteristic features, an effective display apparatus can be formed by using such surface conduction electron-emitting devices. For example, in a display apparatus comprising a large number of surface conduction electron-emitting devices in correspondence to pixels, images can be displayed by sequentially scanning the display screen, exploiting the above identified first characteristic feature. With such a display apparatus, a voltage above the threshold voltage $V_{th}$ is applied to each of the devices being driven as a function of the desired luminance of emitted light, while a voltage below the threshold voltage $V_{th}$ is applied to each of the unselected devices. The display screen can be sequentially scanned to display images by selecting devices to be driven also in a sequential manner. Additionally, images with delicate tones can be displayed by controlling the luminance of emitted light, exploiting the above identified second and third characteristic features.

Now, a method of driving an image-forming apparatus such as a display apparatus according to the invention will be described by referring to FIGS. 18 to 21.

Figure 18:
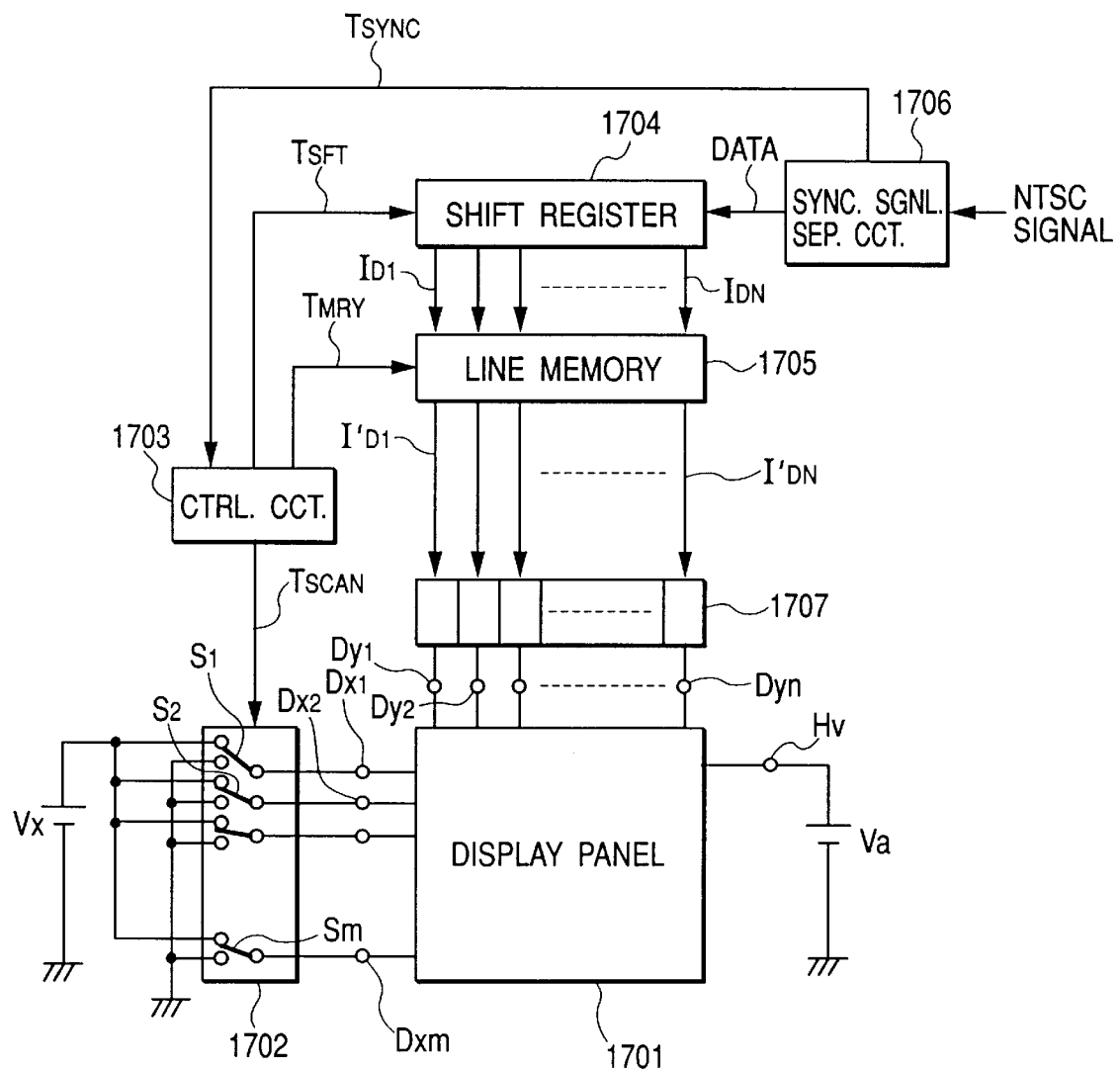
FIG. 18 is a schematic block diagram of the drive circuit of an image-forming apparatus according to the invention.

FIG. 18 is a block diagram of a drive circuits for driving a display apparatus for displaying television images according to NTSC television signals. In FIG. 18, reference numeral 1701 denotes a display panel of the type as described above in terms of manufacturing method and operation. Otherwise, the circuit comprises a scan circuit 1702 for scanning display lines, a control circuit 1703 for generating signals to be sent to the scan circuit, a shift register 1704 for shifting data on a line by line basis, a line memory 1705 for receiving data for a line and sending them to a modulation signal generator 1707 and a synchronizing signal separation circuit 1706 for separating synchronizing signals from NTSC signals.

The operation of each of the components of the circuit of FIG. 18 will be described in greater detail below. The display panel 1701 is connected to external circuits via terminals Dx1 through Dx$m$, Dy1 through Dy$m$ and a high voltage terminal Hv, of which the terminals Dx1 through Dx$m$ are connected to a multi-electron-beam source of the display panel 1701 comprising cold cathode devices arranged to show a matrix of m rows and n columns with a matrix wiring arrangement in order to drive the cold cathode devices on a row by row basis (each row having n devices) by applying a scan signal. On the other hand, the terminals Dy1 through Dy$n$ are designed to receive a modulation signal for controlling the output electron beam of each of the devices of a row selected by a scan signal. The high voltage terminal Hv is fed by a DC voltage source $V_a$ with a DC voltage of a level typically around 5 kV, which is an acceleration voltage sufficiently high for electron beams emitted from the multi-electron-beam source to energize the fluorescent bodies of the display apparatus. The scan circuit 1702 operates in a manner as follows. The circuit comprises m switching devices (of which only devices S1 and Sm are specifically indicated in FIG. 18), each of which takes either the output voltage of the DC voltage source Vx or 0[V] (the ground potential level) and comes to be connected with one of the terminals Dx1 through Dx$m$ of the display panel 1701. Each of the switching devices S1 through Sm operates in accordance with control signal $T_{SCAN}$ fed from the control circuit 1703 and can be prepared easily by combining transistors such as FETs. The DC voltage source Vx of this circuit is designed to output a constant voltage such that any drive voltage applied to the devices that are not being scanned is reduced to less than the threshold voltage $V_{th}$ due to the electron-emitting performance of each device as illustrated in FIG. 17. The control circuit 1703 coordinates the operations of related components so that images may be appropriately displayed in accordance with externally fed video signals. It generates control signals $T_{SCAN}$, $T_{SFT}$ and $T_{MRY}$ for related components in response to synchronizing signal $T_{SYNC}$ fed from the synchronizing signal separation circuit 1706, which will be described below. The synchronizing signal separation circuit 1706 separates the synchronizing signal component and the luminance signal component form an externally fed NTSC television signal and can be easily realized using a popularly known frequency separation (filter) circuit. Although a synchronizing signal extracted from a television signal by the synchronizing signal separation circuit 1706 comprises, as well known, a vertical synchronizing signal and a horizontal synchronizing signal, it is simply designated as $T_{SYNC}$ signal here for convenience sake, disregarding its component signals. On the other hand, a luminance signal separated from a television signal, which is fed to the shift register 1704, is designated as DATA signal. The shift register 1704 carries out for each line a serial/parallel conversion on DATA signals that are serially fed on a time series basis in accordance with control signal $T_{SFT}$ fed from the control circuit 1703. In other words, a control signal $T_{SFT}$ operates as a shift clock for the shift register 1704. A set of data for a line that have undergone a serial/parallel conversion (and correspond to a set of drive data for N electron-emitting devices) are sent out of the shift register 1704 as N parallel signals $I_{D1}$ through $I_{DN}$. The line memory 1705 is a memory for storing a set of data for a line, which are signals $I_{D1}$ through $I_{DN}$ for a required period of time according to control signal $T_{MRY}$ coming from the control circuit 1703. The stored data are sent out as $I'_{D1}$ through $I'_{DN}$ and fed to the modulation signal generator 1707. The modulation signal generator 1707 is in fact a signal source that appropriately drives and modulates the operation of each of the electron-emitting devices and its output signals are fed to the cold cathode devices in the display panel 1701 via terminals Dy1 through Dy$n$. As described above by referring to FIG. 17, an electron-emitting device, to which the present invention is applicable, shows a clear threshold voltage $V_{th}$ for electron emission (which is 8[V] for surface conduction electron-emitting devices used in the examples as will be described hereinafter) and emits electrons only when a voltage exceeding the threshold voltage $V_{th}$ is applied thereto. Above the threshold voltage $V_{th}$, the emission current $I_e$ of the device changes as a function of the voltage as illustrated by the graph of FIG. 17. The threshold voltage $V_{th}$ and the relationship between the voltage applied to the device and the emission current of the device may vary depending on the materials, the configuration and the manufacturing method of the electron-emitting device.

The functions of the components of the circuit of FIG. 18 are described above. Now, the operation of the display panel 1701 will be described in greater detail by referring to FIGS. 19 to 21. Assume here that the display panel comprises cold cathode devices that are surface conduction electron-emitting devices having a threshold voltage $V_{th}$ of 8[V] as in the case of the examples as will be described hereinafter.

Figure 19:
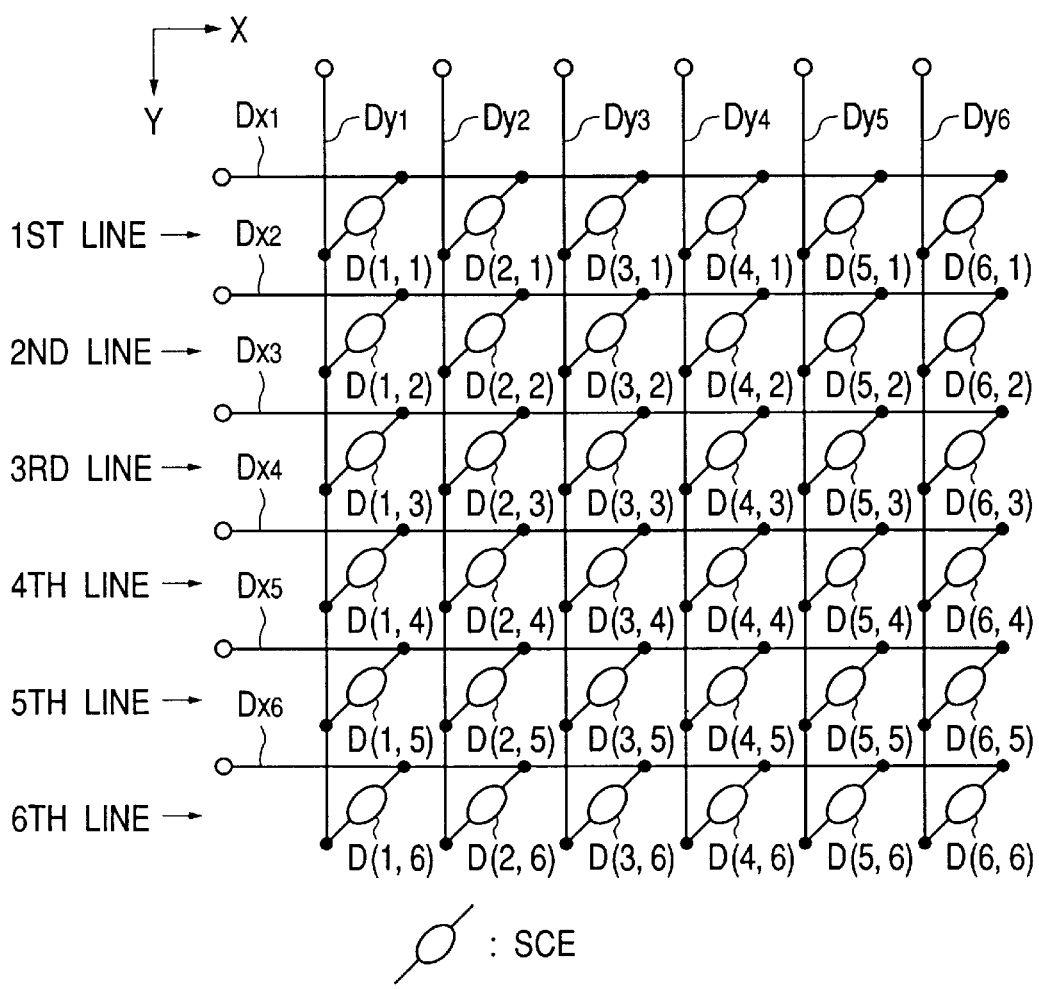
FIG. 19 is a partial circuit diagram of the electron source of an image-forming apparatus according to the invention.
Figure 21:
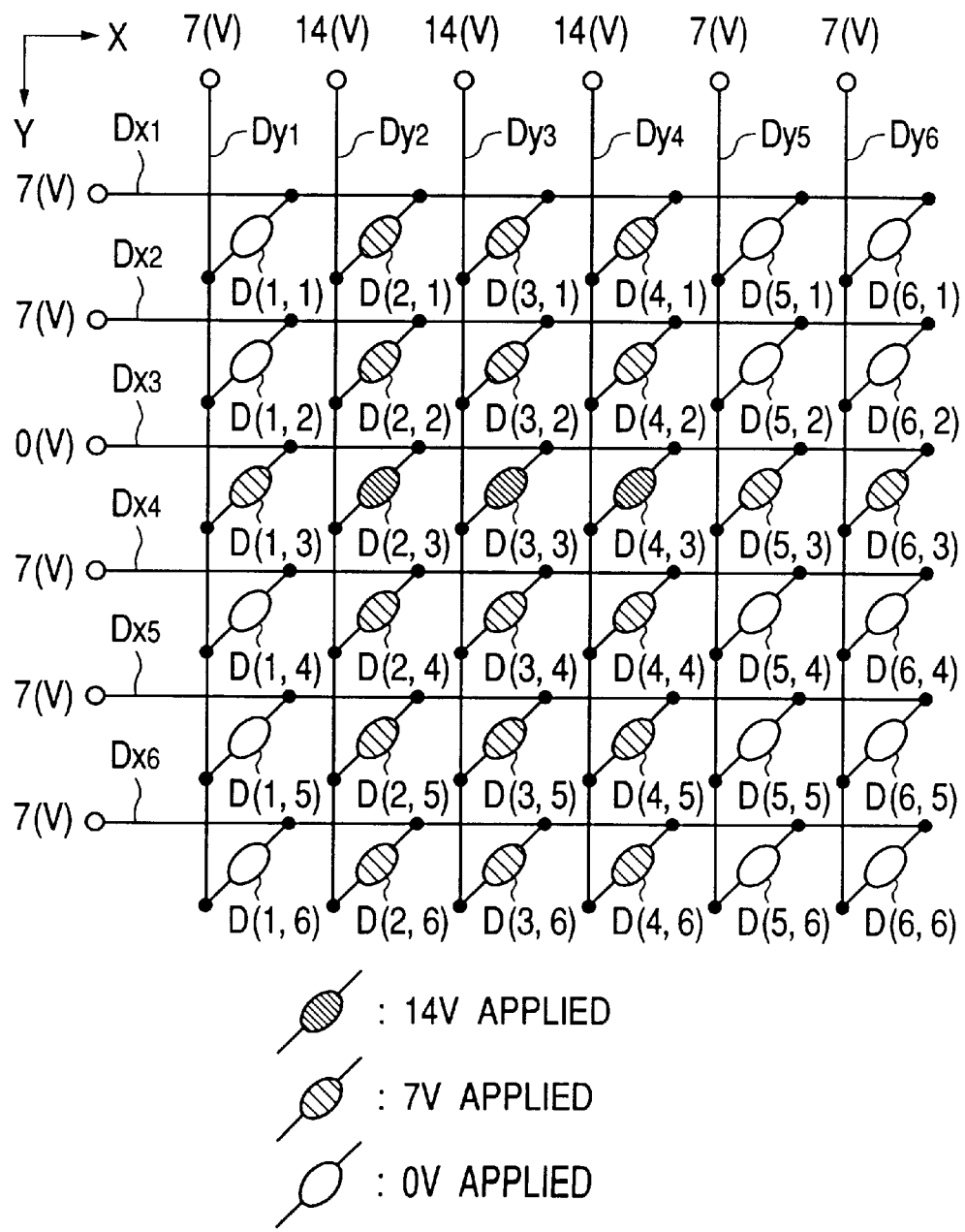
FIG. 21 is a partial circuit diagram of the electron source of an image-forming apparatus according to the invention, showing the potential status thereof when a drive voltage is applied thereto.

FIG. 19 shows a multi-electron-beam source realized by arranging surface conduction electron-emitting devices to the form of a matrix of six rows and six columns with a matrix wiring arrangement. For the convenience of description, the devices are identified by means of an (X, Y) coordinate system so that coordinate denominations D(1, 1), D(1, 2), . . . , D(6, 6) are respectively assigned to them. For displaying images by driving the multi-electron-beam source having such a configuration, the rows (or lines) of devices that run in parallel with the X-axis are driven as units of an image on a line-by-line basis. The surface conduction electron-emitting devices that correspond to a line of the image are driven by applying 0[V] to the terminal of the row, which is one of Dx1 through Dx6 that corresponds to the display line, while applying 7[V] to the terminals of the remaining rows. In synchronism with this voltage applying operation, modulation signals are applied to the respective terminals of the columns Dy1 through Dy6 according to the image pattern of the line. For example, assume that an image as shown in FIG. 20 is displayed on the display screen of the apparatus and now the time comes to cause the third line to emit light for the image. FIG. 21 shows the voltages applied to the multi-electron-beam source by way of the terminals Dx1 through Dx6 and Dy1 through Dy6 while the third line is emitting light for the image. As seen from FIG. 21, a voltage of 14[V] that is higher than the threshold voltage $V_{th}$ of 8[V] for electron emission is applied to the surface conduction electron-emitting devices denoted by D(2, 3), D(3, 3) and D(4, 3) (block devices in FIG. 21) to make them emit electron beams. On the other hand, 7[V] is applied to some of the remaining devices (shaded devices in FIG. 21) while 0[V] is applied to the others (white devices in FIG. 21) but any of these devices does not emit an electron beam because the both voltages are below the threshold voltage of 8[V]. The multi-electron-beam source is driven in a similar manner for the remaining lines according to the image to be displayed shown in FIG. 20 on a line-by-line basis so that the image is displayed on the screen of the display apparatus.

Embodiments

Now, the present invention will be described further by way of examples.

In Examples 1 through 4 described hereinafter, SCE devices comprising an electron-emitting region formed in an electroconductive fine particle film arranged between a pair of electrodes as described earlier were used for the multi-electron-beam source, whereas FE type devices were used in Example 5. In each of the examples, the multi-electron-beam source was made to comprise N×M (N=3,072, M=1, 024) devices that were arranged to form a matrix having M rows and N columns along with a matrix wiring arrangement (see FIGS. 2 and 3).

Firstly, the method commonly used for preparing the multi-electron-beam source comprising SCE devices for Examples 1 through 4 will be described.

As described below, in each of Example 1 through 4, a substrate carrying thereon a total of N×M pieces of electroconductive fine particle film was prepared with a matrix wiring arrangement. The steps of the manufacturing method will be described in terms of each device by referring to FIGS. 22A to 22H, which respectively correspond to Steps a through h below.

Step a: After thoroughly cleansing a soda lime glass plate, a 0.5[µm] thick silicon oxide film was formed by sputtering to produce an insulating substrate 11', on which Cr and Au were sequentially laid to thicknesses of 5[nm] and 500[nm] respectively by vacuum evaporation and then photoresist (AZ1370: available from Hoechst Corporation) was applied thereto by means of a spinner, while rotating the substrate, and baked. Thereafter, a photomasked image was exposed to light and developed to produce a resist pattern for column-directional wires 14 and then the deposited Au/Cr film was wet-etched to produce column-directional wires 14 having a desired profile.

Step b: A silicon oxide film was formed as an interlayer insulation layer 33 to a thickness of 1.0[µm] by RF sputtering.

Step c: A photoresist pattern was prepared for producing contact holes 33a in the silicon oxide film deposited in Step b, which contact holes 33a were then actually formed by etching the interlayer insulation layer 33, using the photoresist pattern as mask. RIE (Reactive Ion Etching) using $CF_4$ and $H_2$ gas was employed for the etching operation. Step d: Thereafter, a pattern of photoresist (RD-2000N-41: available from Hitachi Chemical Co., Ltd.) was formed for pairs of device electrodes and gaps separating the respective pairs of electrodes and then Ti and Ni were sequentially deposited thereon respectively to thicknesses of 5[nm] and 100[nm] by vacuum evaporation. The photoresist pattern was dissolved by an organic solvent and the Ni/Ti deposit film was treated by using a lift-off technique to produce pairs of device electrodes 2 and 3, each pair having a width W (see FIG. 9A) of 300[µm] and separated from each other by a distance L (see FIG. 9A) of 3[pm].

Step e: After forming a photoresist pattern on the device electrodes 2 and 3 for row-directional wires 13, Ti and Au were sequentially deposited by vacuum evaporation to respective thicknesses of 5[nm] and 600[nm] and then unnecessary areas were removed by means of a lift-off technique to produce row-directional wires 13 having a desired profile.

Step f: A Cr film 34 was deposited by vacuum evaporation to a thickness of 100[nm], which was then subjected to a patterning operation using a mask having an opening 35a bridging the pair of device electrodes 2 and 3 separated by a distance of L as shown in FIG. 23. Then, an organic palladium solution (ccp 4230: available from Okuno Pharmaceutical Co., Ltd.) was applied thereto by means of a spinner, while rotating the substrate, and baked at 300° C. for 10 minutes to produce an electron-emitting region-forming film (electroconductive film) 4, which comprised fine particles containing Pd as principal ingredient and showed a film thickness of about 10[nm] and a sheet resistance of $5 \times 10^4 [\Omega/\square]$. The term "fine particle film" as used herein refers to a film containing agglomerates of fine particles, where fine particles may be not only dispersed but also located close to each other or laid on one another (to produce an island state). The term "particle diameter" as used herein refers to the diameter of a particle that can be identified under the above described condition. An organic metal solution (organic Pd solution in this embodiment) that can be used for the purpose of the invention contains an organic compound of a metal selected from Pd, Ru, Ag, Au, Ti, In, Cu, Cr, Fe, Zn, Sn, Ta, W and Pb as a primary element. While the organic metal solution was applied to the substrate to form an electron-emitting region-forming thin film 4 in this embodiment, an electroconductive film may be formed from an organic metal solution by using some other technique such as vacuum evaporation, sputtering, chemical vapor phase deposition, dispersion application, dipping or spinning.

Step g: The Cr film 34 was removed by an acidic etchant to produce an electron-emitting region-forming thin film 4 having a desired profile.

Step h: Then, a resist pattern was formed by applying resist to the entire surface of the substrate except the area for a contact hole 33a and Ti and Au were sequentially deposited by vacuum deposition to respective thicknesses of 5[nm] and 500[nm]. Any unnecessary areas were removed by means of a lift-off technique to consequently fill the contact holes 33a.

With the above steps, (M×N) electroconductive films 4 connected to M row-directional wires 13 and N column-directional wires 14 by way of respective device electrode pairs 2 and 3 were formed in the form of a matrix on the insulating substrate 11'.

EXAMPLE 1

In this example, a display panel comprising spacers 20 as shown in FIG. 1 was prepared. The display panel was so designed as to be driven with an acceleration voltage of $V_a$=5 kV, an image displaying frequency of 60 Hz (or $\Delta T$=16.7 ms) and a maximum drive pulse width of 100 μs ($\Delta t$=100 μs) per device. The process of preparing the display panel will be described in greater detail by referring to FIGS. 1 and 2. Firstly, the above described substrate 11' carrying thereon a matrix of electroconductive films (electron-emitting region-forming films) was rigidly fitted to a rear plate 15. Then, for each of the spacers, a Cr oxide film was formed to a thickness of 200[nm] by sputtering a Cr target by means of a high frequency power source to produce a high resistance film 20b on the four sides of the insulating member 20a that had been prepared by forming an $SiN_x$ or $SiO_x$ layer to a thickness of about 100[nm] on a piece of soda lime glass, the four sides of the spacer being those to be exposed to the internal space of the envelope (airtight container). A mixture gas of Ar and $O_2$ showing a pressure of 0.13[Pa] was used for the sputtering. The prepared high resistance film 20b was a film containing grains, or agglomerates of fine particles, with a diameter of about 60[nm] and showed a surface resistance of about $10^9[\Omega/\square]$. This sample is referred to as Sample A. The following samples were also prepared by differentiating the film thickness, the sputtering pressure and the partial pressure ratio.

Sample B: film thickness 300[nm],
   grain diameter 80[nm],
   surface resistance ca. $10^8[\Omega/\square]$
Sample C: film thickness 200[nm],
   grain diameter 30[nm],
   surface resistance ca. $10^9[\Omega/\square]$
Sample D: film thickness 80[nm],
   grain diameter 60[nm],
   surface resistance ca. $10^{10}[\Omega/\square]$ The above four samples were driven with a drive pulse of 14[V] for 1[ms] at 1[Hz] by means of a gauging system as shown in FIG. 28 to observe the time constant for the electrically charging phase, the time constant for the electrically discharging phase and the change in the electric potential of the center of the spacer at the time of electron emission. An acceleration voltage of $V_a$=5[kV] was used and the device/spacer distance and the spacer height were l=400[μm] and d=[5 mm] respectively. The results are shown below.

Sample A: 220[μsec], 7[msec], 400[V]
Sample B: 220[μsec], 3[msec], 250[V]
Sample C: 250[μsec], 20[msec], 400[V]
Sample D: 400[μsec], 30[msec], 600[V]

As seen from above, while the change in the electric potential of the spacer is highly dependent on the electric resistance of the high resistance thin film 20b, the time constant $\tau_u$ for the electrically charging phase and the time constant $\tau_d$ for the electrically discharging phase seem to be more dependent on the electric capacity that may vary according to the state of the grains rather than the resistance of the high resistance thin film 20b.

It should be noted that the value of $\tau_d$ is greater than that of $\tau_u$ and the image displaying performance of the display apparatus using these samples is highly dependent on the relationship between the value of $\tau_d$ and the image displaying frequency.

From equation (14) cited earlier, positional deviations of electron beams do not affect the displayed image if $$\Delta V_{sat} < 2\alpha\beta \cdot l^2/d^2 \cdot V_a.$$

Hence, the estimated approximate values of $\Delta V_{sat}$ for the samples are as follows:

Sample A: 160[V]
Sample B: 90[V]
Sample C: 230[V]
Sample D: 311[V]

On the other hand, if $2\alpha\beta$=5, since $$2\alpha\beta \cdot l^2/d^2 V_a = 160[V]$$

in this example, Samples A and B are expected to provide a favorable result, whereas Samples C and D may produce positional deviations of electron beams.

In order to prove the above expectation, image-forming apparatus were prepared by respectively using spacers of Samples A, B and C in a manner as described below. The use of spacers of Sample D was excluded because the change in the electric potential at the center of the spacer was so large. Note that the spacers 20 had a height of 5[mm], a thickness of 200[pm] and a length of 20[mm].

Firstly, spacers 20 were arranged at regular intervals on the selected row-directional wires 13 in parallel with the latter and firmly secured in position. The row-directional wires 13 were arranged with an interval of 1[mm] and the cold cathode devices 111 were arranged at the middle of the adjacent row-directional wires 13. Therefore, the device/spacer distance (indicated by 1) was about 0.4[mm].

Thereafter, a face plate 17 carrying a fluorescent film 18 and a metal back 19 on the inner surface thereof was arranged 5[mm] above the substrate 11' with lateral walls 16 interposed therebetween. Then, the rear plate 15, the face plate 17, the lateral walls 16 and the spacers 20 were firmly bonded to each other. More specifically, frit glass (not shown) was applied to the junctions of the substrate 11' and the rear plate 15, the rear plate 15 and the lateral walls 16 and the face plate 17 and the lateral walls 16 and baked in the atmosphere at 400° C. to 500° C. for more than 10 minutes to produce a hermetically sealed envelope. As described above, the spacers 20 were bonded and electrically connected to the selected row-directional wires 13 (having a width of 300[μm]) on the substrate 11' and to the metal back 19 on the face plate 17 by means of electroconductive frit glass containing an electroconductive substance such as metal, which was baked in the atmosphere at 400° C. to 500° C. for more than 10 minutes.

Figure 22A:
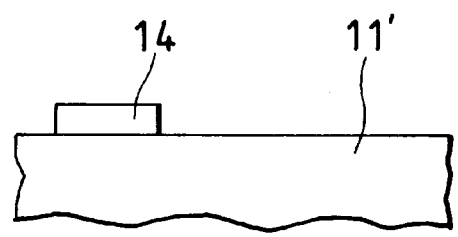
FIGS. 22A, 22B, 22C, 22D, 22E, 22F, 22G and 22H are partial schematic cross sectional views of an electron source that can be used for an image-forming apparatus according to the invention, showing different manufacturing steps thereof.
Figure 22B:
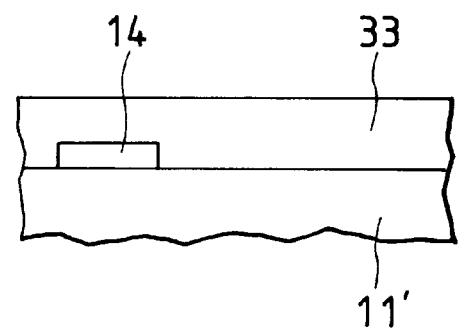
Figure 22C:
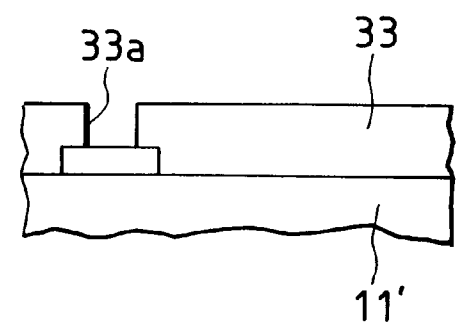
Figure 22D:
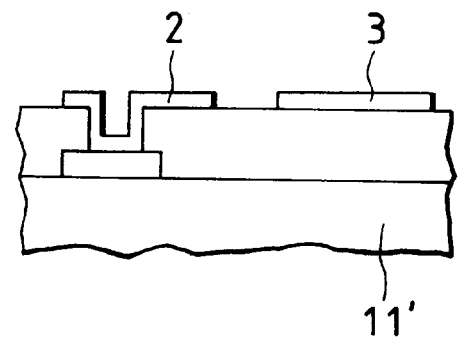
Figure 22E:
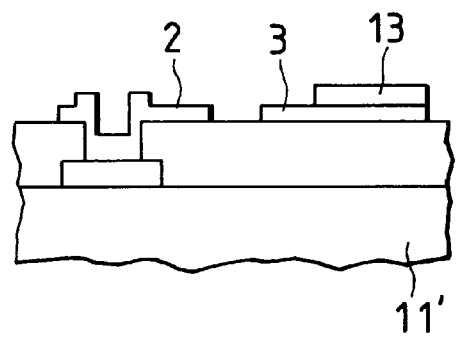
Figure 22F:
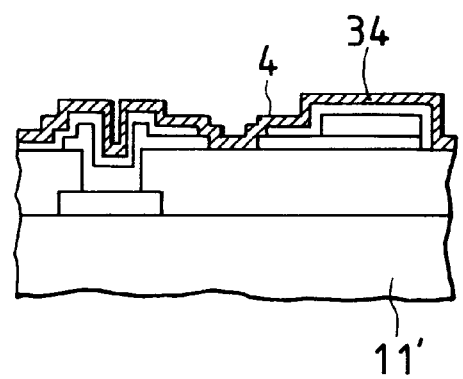
Figure 22G:
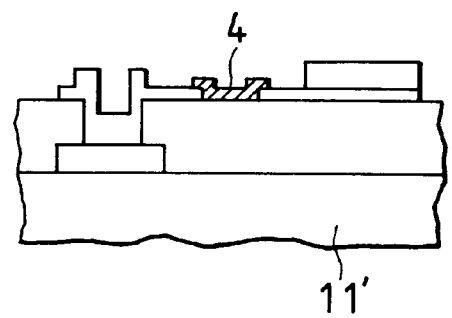
Figure 22H:
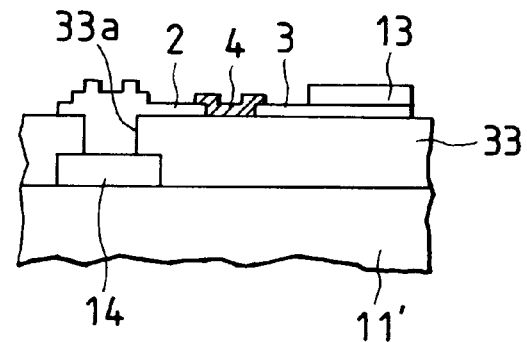

In this example, a fluorescent film 18 comprising stripe-shaped fluorescent bodies 21a of the primary colors arranged regularly along the Y-direction and a grid-like black conductive member 21b arranged to separate the (R, G and B) fluorescent bodies 21a and the pixels along the Y-direction was used as shown in FIG. 24. The spacers 20 were arranged on the corresponding regions of the black conductive member 21b (having a width of 300[$\mu$m]) running along the X-direction with the metal back 19 disposed therebetween. When the envelope was hermetically sealed, the rear plate 15, the face plate 17 and the spacers 20 were carefully aligned to ensure a rigorous positional correspondence between each of the fluorescent bodies of the primary colors 21a and the corresponding one of the electron-emitting region-forming electroconductive films 4 formed on the substrate 11' (FIG. 22H).

The prepared envelope (airtight container) was then evacuated by means of an exhaust pipe (not shown) and an exhaust pump to produce a sufficient degree of vacuum inside the container. Thereafter, the electron-emitting region-forming electroconductive films 4 were subjected to an electrically energizing operation (energization forming process), where a voltage was applied to them by way of the external terminals Dx1 through Dx$m$ and Dy1 through Dy$n$ to produce an electron-emitting region in each electroconductive film (see FIG. 2). Thus, a multi-electron-beam source comprising a matrix of cold cathode devices 12, or surface conduction electron-emitting devices as shown in FIGS. 2 and 3, was prepared. The voltage having a waveform as shown in FIG. 12 was used for the energization forming process.

Then, the exhaust pipe (not shown) was molten and closed by heating it with a gas burner, while keeping the inside to a degree of vacuum of about $1.3 \times 10^{-4}$[Pa], in order to hermetically seal the envelope (airtight container).

Finally, gettering operation was carried out in order to maintain a high degree of vacuum in the glass container.

The finished image-forming apparatus was operated by applying a scan signal and a modulation signal to each of the cold cathode devices (electron-emitting devices) 12 by way of the external terminals Dx1 through Dx$m$ and Dy1 through Dy$n$ from a signal generating means (not shown) to cause the electron-emitting devices to emit electrons. Meanwhile, a high voltage was applied to the metal back 19 by way of the high voltage terminal Hv to accelerate the emitted electron beams and cause them to collide with the fluorescent film 18 so that the fluorescent bodies 21a of the primary colors (Rs, Gs, and Bs in FIG. 24) were energized to emit light to display intended images. The frame frequency was held to 60[Hz]. The voltage $V_a$ applied to the high voltage terminal Hv and the voltage $V_f$ applied to each of the wires 13 and 14 were 5[kV] and 14[V] respectively and the drive pulse was a rectangular pulse wave with a pulse width of 100[$\mu$sec].

In the case of the image-forming apparatus using either Sample A or B, an array of light emitting spots were produced two-dimensionally at regular intervals on the display screen, including those formed by electrons emitted from the cold cathode devices 12 located close to the spacer 20. Thus, clear color images were displayed with an excellent color reproducing effect on the display screens of the image-forming apparatus using Samples A and B. To the contrary, with the image-forming apparatus using Sample C, deviations of electron beams were observed on several lines located close to the spacers to indicate that the time constant for the electrically discharging phase is vital for avoiding disturbances in the electric field that can adversely affect the trajectories of electrons when spacers are arranged and made to show only a little change in the electric potential during an electron emitting operation.

EXAMPLE 2

In this example, a number of display panels using spacers of Sample A of Example 1 were prepared. They include those with respective device/spacer distances 1 of 10[mm] (Panel A), 0.8[mm] (Panel B), 0.35[mm] (Panel C) and 0.25[mm] (Panel D). In all respects other than the device/spacer distance 1, the display panels were identical and prepared by the method same as the one used in Example 1.

In Example 1, the time constants for the electrically charging/discharging phases and the rise in the electric potential of sample A were observed with a device/spacer distance of l=0.4[mm], a device/acceleration electrode distance of d=5[mm] and an acceleration voltage of $V_a$=5[kV] (evaluation parameters). From equation (8) cited earlier, the potential rise $\Delta V_{mes}$ is expressed by the formula below;

$$\Delta V_{mes} = RQ'/8 \cdot (1-\exp(-\Delta t_{mes}/\tau_u))/(1-\exp(-\Delta T_{mes}/\tau_d)).$$

Since $\Delta t_{mes}$=1[msec] and $\Delta T_{mes}$=1[sec], $\Delta t_{mes} >> \tau_u$ and $\Delta T_{mes} >> \tau_d$ Hence, $$\Delta V_{mes} = RQ'/8.$$

Thus, in Example 1, where spacers were arranged with l=0.4[mm], the value of RQ'/8 was 400[V] (actual value).

Then, if the display panel is driven with an image display frequency of 60 Hz (AT=16.7 ms), a drive pulse width of $\Delta t$=100 $\mu$s and an acceleration voltage of $V_a$=5 kV and if equation (8) is used, $$\Delta V_{sat} = RQ'/8 \cdot (1-\exp(-\Delta t/\tau_u))/(1-\exp(-\Delta T/\tau_d)),$$

hence $\Delta V_{sat}$ will be 160[V] (calculated value) because $\Delta T$=16.7[msec], $\Delta t$=100[$\mu$sec], $\tau_u$=220[$\mu$sec] and $\tau_d$=7 [msec].

If the potential rises of the Panels A, B, C and D of this example are expressed by $\Delta V_{sat}(A)$, $\Delta V_{sat}(B)$, $\Delta V_{sat}(C)$ and $\Delta V_{sat}(D)$ respectively, it may be safe from the differences in the device/spacer distance l to assume a relationship of;

$$\Delta V_{sat}(A) < \Delta V_{sat}(B) < 160[V] < \Delta V_{sat}(C) < \Delta V_{sat}(D)$$

because the probability of electrons hitting the spacer surface is higher for electron-emitting devices located close to a spacer to show a large value for $\Delta V_{sat}$.

Then, using equation (14) for determining the allowance for $\Delta V_{sat}$ with $2\alpha\beta$=5, d=5[mm] and $V_a$=5[kV], the relationships below can be established.

$$\Delta V_{sat}(A) << 5 \cdot l^2/d^2 \cdot V_a$$

$$\Delta V_{sat}(B) << 5 \cdot l^2/d^2 \cdot V_a$$

$$\Delta V_{sat}(C) < 5 \cdot l^2/d^2 \cdot V_a$$

$$\Delta V_{sat}(D) << 5 \cdot l^2/d^2 \cdot V_a$$

Thus, it will be appreciated that Panels A and B satisfy the relationship of formula (14), whereas Panels C and D do not, so that Panels A and B will operate well.

Each of the finished image-forming apparatus was operated by applying a scan signal and a modulation signal to each of the cold cathode devices (electron-emitting devices) 12 by way of the external terminals Dx1 through Dxm and Dy1 through Dyn from a signal generating means (not shown) to cause the electron-emitting devices to emit electrons. Meanwhile, a high voltage was applied to the metal back 19 by way of the high voltage terminal Hv to accelerate the emitted electron beams and cause them to collide with the fluorescent film 18 so that the fluorescent bodies 21a (see FIG. 4A) were energized to emit light to display intended images. The voltage $V_a$ applied to the high voltage terminal Hv and the voltage $V_f$ applied to each of the wires 13 and 14 were 5[kV] and 14[V] respectively and the drive pulse was a rectangular pulse wave with a pulse width of 100[μsec]. The frame frequency was held to 60[Hz].

As may be expected from the above discussion, Panel D showed remarkably deviated electron beams on several lines located close to spacers and Panel C showed a deviation of about 10[μm] on a line located adjacent each of the spacers. To the contrary, clear color images were displayed with an excellent color reproducing effect on the display screens of Panels A and B, forming two-dimensionally arranged rows of light-emitting spots with a regular interval including spots by emitted electrons from cold cathode devices (surface conduction type) located closely to spacers.

This fact suggests that Panels A and B satisfied the configurational requirements (device/spacer distance, device/acceleration electrode distance, etc.) and the high resistance thin film formed on the spacers satisfied the requirements imposed on them so that the latter did not adversely affect the courses of electrons nor disturb the electric field within the panel, whereas Panels C and D, Panel D in particular, did not and gave rise to disturbances in the electric field within the panel.

EXAMPLE 3

In this example, the display panel comprising cold cathode devices of Sample 1 of Example 1 was driven with a frame frequency of 30[Hz]. Note that Sample 1 represents devices that gave rise to deviated electron beams when driven with an image display frequency of 60 Hz in Example 1.

Figure 25:
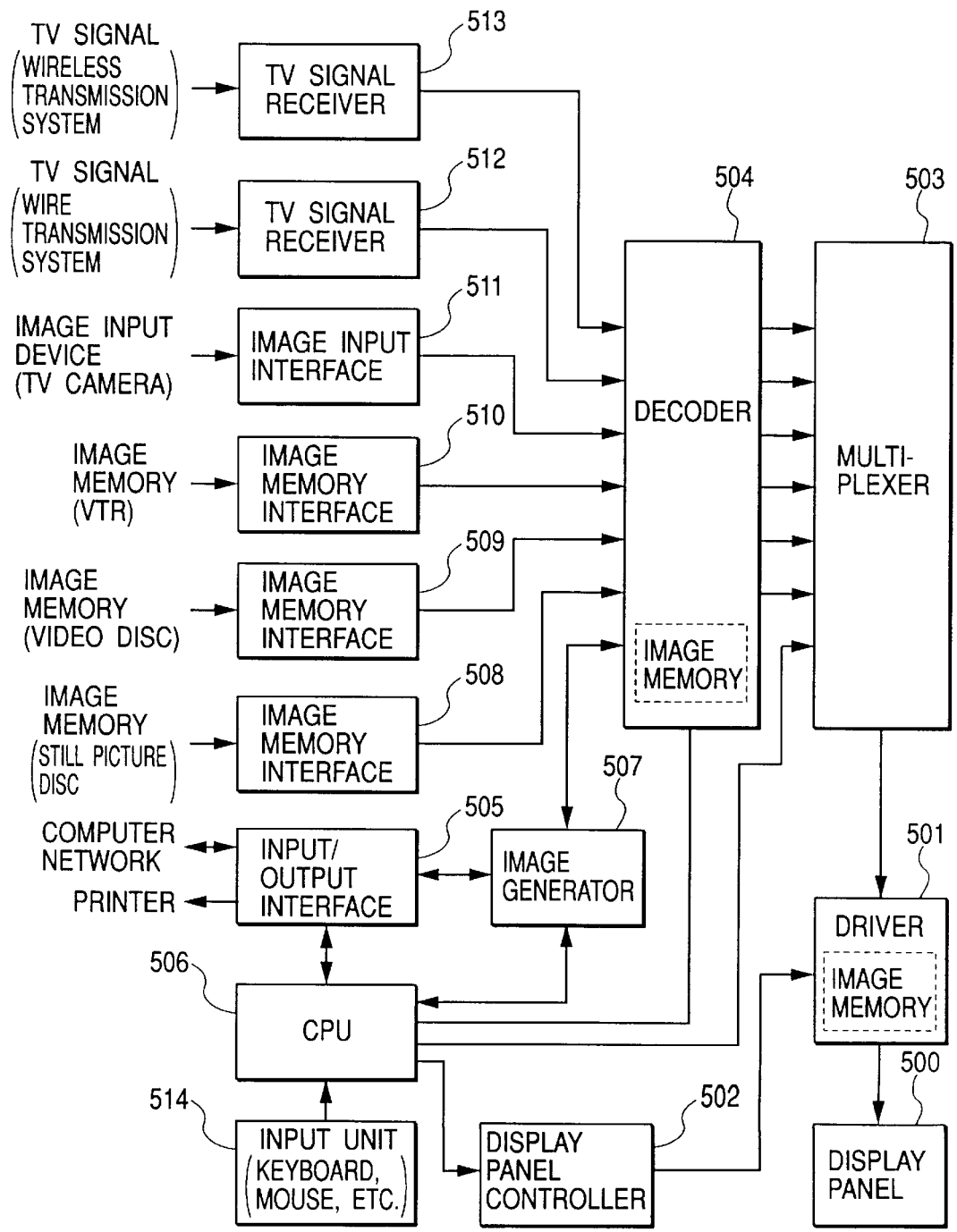
FIG. 25 is a schematic block diagram of an image-display apparatus representing an application of an image-forming apparatus according to the invention.

FIG. 25 shows a schematic block diagram of an image-forming apparatus.

The TV signal reception circuits 512 and 513 are circuits for receiving TV image signals transmitted via a wireless transmission system and a wired transmission system respectively. The image input interface circuit 511 is a circuit for receiving image signals fed from an image input device such as a TV camera or an image pick-up scanner. The image memory interface circuits 508, 509 and 510 are circuits for retrieving image signals stored in a video tape recorder, a video disc and a device for storing still image data respectively. The input/output interface circuit 505 is a circuit for connecting the display apparatus and an external output signal source such as a computer, a computer network or a printer. The image generation circuit 507 is a circuit for generating image data to be displayed on the display screen on the basis of the image data and the data on characters and graphics input from an external output signal source via the input/output interface circuit 505 or those coming from the CPU 506. Image data generated by any of the above described circuits for display are sent to the decoder 504, which transforms image signals back into signals for three primary colors, luminance signals and I and Q signals. The image data are then sent to the multiplexer 503, which appropriately selects images to be displayed on the display screen according to control signals given by the CPU 506.

The CPU 506 controls the display apparatus and carriers out the operation of generating, selecting and editing images to be displayed on the display screen. The input section 514 is used for forwarding the instructions, programs and data given to it by the operator to the CPU 506. As a matter of fact, it may be selected from a variety of input devices including keyboards and mice.

The display panel controller 502 is a circuit for controlling the operation of the drive circuit 501 according to control signals transmitted from CPU 506. For example, the display panel controller 502 operates to transmit signals representing an image display frequency and scanning procedures. Thus, a display frequency of 30 Hz may be selected by the display panel controller 502. The drive circuit 501 comprises an image memory within it for generating drive signals to be applied to the display panel 500 on the basis of the image signal transmitted from the multiplexer 503 and in synchronism with the image display clock transmitted from the display panel controller 502.

In this example, a display panel 500 prepared by using spacers of Sample C of Example 1 was used. The time constant of the spacers for the electrically discharging phase was 20[msec]. Images were displayed on the display panel with various drive frequencies by means of the display controller 502. A rectangular pulse voltage having a pulse width of 100[μm] and a wave height of 14[V] was applied to drive the devices.

As a result, noticeable deviations of electron beams were observed when the panel was driven with a frame frequency of 60[Hz] as described in Example 1 and electron beam deviations were also observed on more than 10 lines located close to each of the spacers when the panel was driven with a frame frequency of 120[Hz], whereas the extent of electron beam deviations was reduced to a visually unnoticeable level when the panel was driven with a frame frequency of 30[Hz]. This means that an image-forming apparatus that may display satisfactory images with a certain image display frequency may be made to display improved images by selecting an optimal image display frequency by means of the display controller.

EXAMPLE 4

In this example, a 60-inch display apparatus adapted to the HDTV system and comprising pixels and spacers arranged in a manner as shown in FIGS. 2 and 3 was prepared. It was designed to operate with an image display frequency of 30 Hz (ΔT=33.3 ms), a drive pulse width of Δt=30 μs and an acceleration voltage of $V_a$=8 kV.

The electron source of this apparatus comprised SCE devices. Electron beams emitted from the electron source are deviated in a direction parallel to the spacers (X-direction in FIG. 2) before they strike the fluorescent bodies.

Each pixel was arranged within a rectangular area of 720 μm×240 μm (for each of the Rs, Gs and Bs) and the electron-emitting device/spacer distance 1 was about 150 μm.

Each spacer was prepared by forming a layer of noncrystalline silicon nitride film to a thickness of 100[nm] on an insulating member by means of a plasma CVD technique. A mixture gas of silane and nitrogen was used as source gas with an RF power of 100 W and a substrate temperature of 250° C. The optical band gap of the film was about 2.2 eV.

Firstly, a 5 mm high spacer specimen was prepared to evaluate its performance. The potential change at the center of the spacer was observed during an electron emitting operation, using parameters same as those of Example 1

($V_a$=8 kV, $\Delta T$=1 sec, $\Delta t$=1 ms, device drive voltage=14 V, device/spacer distance=0.15 mm), to find that the time constants for the electrically charging and discharging phases were 85 µs and 4.5 ms respectively and the potential change was 50 V. Thus, the value of $\Delta V_{sat}$ in equation (8) is 14.7 V when the display apparatus is actually driven with $\Delta T$=33.3 ms, $\Delta t$=30 µs, $V_a$=8 kV and a device drive voltage of 14 V.

Then, an optimal electron-emitting device/acceleration electrode distance was discussed. A value of d<3.5 mm was determined by looking into the possible range of d, using 1 as a desirable value for $2\alpha\beta$ in equation (15). Therefore, spacers with a height of 3.5 mm were used to manufacture a display panel.

The image-forming apparatus prepared in this example was free from visually noticeable deviations of electron beams including areas located closest to the spacers.

EXAMPLE 5

Figure 34:
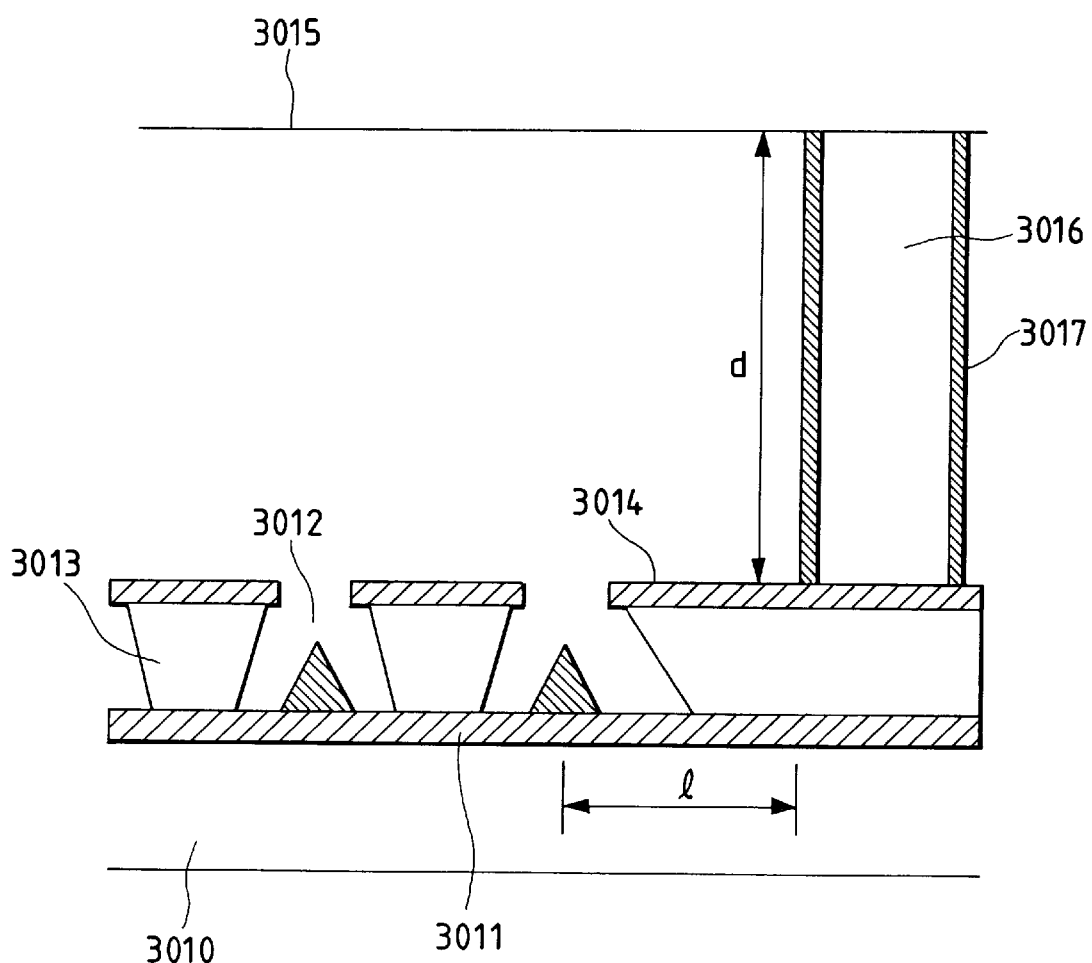
FIG. 34 is a schematic partial cross sectional view of an image-forming apparatus comprising FE type electron-emitting devices.

In this example, an image-forming apparatus comprising FE devices as shown in FIG. 34 as electron-emitting devices was prepared. The apparatus was designed to operate with an image display frequency of 30 Hz ($\Delta T$=33.3 ms), a drive pulse width of $\Delta t$=20 µs and an acceleration voltage of $V_a$=400 V. Each conical emitter was arranged in an area of 0.5 mm×0.5 mm and separated from adjacent ones by a distance of about 10 µm to make it correspond to a pixel. In FIG. 34, there are shown a substrate 3010, an emitter wire 3011, a conical emitter 3012, a 1 µm thick insulation layer 3013, a gate electrode 3014 having an electron emitting hole with a diameter of 1 µm for each device. There are also shown an acceleration electrode 3015, a column-like spacer 3016 having a diameter of 100 µm realized by forming a Cr oxide thin film 3017 to a film thickness of 200[nm] as high resistance thin film on an insulating base member, which corresponds to Sample C in Example 1. The spacer has a height d of 200 µm. The value of l (the distance between the spacer and the emitter located closest to it) in FIGS. 4A and 4B is 40 µm.

Before assembling the image-forming apparatus, the potential change at the center of the spacer and the time constants for the charging and discharging phases were observed as in Example 1, while driving the devices with an acceleration voltage of 400 V, a gate voltage of 80 V, $\Delta T$=1 sec and $\Delta t$=1 ms to find that they were respectively −250 V, 250 µs and 40 ms. The spacer was negatively charged in this example. Then, after assembling the image-forming apparatus, it was driven to operate with an acceleration voltage of 400 V, a gate voltage of 80 V, a device drive pulse width of 20 µs and a frame frequency of 30 Hz ($\Delta T$=33.3 ms). No positional deviations of image-displaying spots due to the spacers were observed. This is because the value of $\Delta V_{sat}$ of equation (8) was −34 V and the requirement of a spacer height d<0.34 mm in equation (15) was met. A value of 10 was used for $2\alpha\beta$ in equation (15) in view of the use of FE type devices.

Thereafter, the apparatus was driven with a frame frequency of 60 Hz to observe a slightly deformed profile for light emitting spots, although it did not provide any problem for displaying images. This is because the value of $\Delta V_{sat}$ of equation (8) was −56.4 V and therefore, while the requirement of a spacer height d<0.43 mm in equation (15) was met for $2\alpha\beta$=10 in equation (15), that of a spacer height d<0.15 mm was not met for a more preferable value of $2\alpha\beta$=2.

It should be noted that any cold cathode type electron-emitting devices other than surface conduction electron-emitting devices may be used for the purpose of the invention. Specific examples include FE type devices such as a field emission type electron-emitting device comprising a pair of electrode arranged on a substrate for an electron source as described in Japanese Patent Application Laid-Open No. 63-274047 filed by the applicant of the present patent application and metal/insulation layer/metal type (MIM type) devices.

The present invention is also applicable to image-forming apparatus comprising an electron source of a type other than the simple matrix arrangement type. Examples of such image-forming apparatus include those designed to select surface conduction electron-emitting devices by means of a control electrode and comprising spacers arranged between the face plate and the control electrode or the electron source and the control electrode as disclosed in Japanese Patent Application Laid-Open No. 2-257551 filed by the applicant of the present patent application.

As described above in detail, an image-forming apparatus according to the invention provides the following advantages.

An image-forming apparatus according to the invention comprises spacers that are provided on the surface with a high resistance thin film that is connected to the electron source and an electrode or at least to two electrodes designed to show different electric potentials and whose time constants for the electrically charging and discharges phases are carefully controlled in addition to a calculated arrangement of spacers and electrodes so that the spacers are relieved of electric charges by optimizing the drive parameters (particularly the image display frequency) even if the time constant for electrically discharging the spacers is relatively large. Thus, the courses followed by electrons emitted from the electron source are not disturbed by the provision of spacers and the image-forming apparatus provides clear and high quality images. In the case of an image-forming apparatus for displaying color images, color breakups are minimized to provide clear color images.

What is claimed is:

1. An image-forming apparatus comprising a device substrate carrying thereon an electron source comprising a plurality of cold cathode type electron-emitting devices, an acceleration electrode arranged oppositely relative to said device substrate for accelerating electrons emitted from said electron source, an envelope having a hermetically sealed structure for maintaining a vacuum condition between said device substrate and said acceleration electrode and a number of spacers for supporting said envelope, characterized in that the relationship between the electric potential Va of the acceleration electrode, the distance l between the electron-emitting devices and the corresponding respective spacers and the distance d between the electron-emitting devices and the acceleration electrode is expressed by the formula below;

$$V_a \cdot l^2/d^2 > |\Delta V_{sat}|/(2\cdot\alpha\cdot\beta),$$

where $\alpha$ is a constant defined by the positional arrangement of the members that determine the potential profile within the image-forming apparatus, $\beta$ is a constant defining the allowable deviational range of the brilliant points on the image display member of the apparatus and $\Delta V_{sat}$ is the potential deviation from the electric potential of the spacer surface when the latter is not electrically charged under normal driving condition of the apparatus, said potential deviation being defined by the equation below;

$$\Delta V_{sat} = RQ'/8 \cdot (1-\exp(-\Delta t/\tau_u))/(1-\exp(-\Delta T/\tau_d)),$$

where R is the electric resistance of each spacer in the direction perpendicular to the device substrate, Q' is the rate of change of the electric charge of the spacer surface, ΔT is the time period for displaying a frame of an image, Δt is the time period for driving a device, $\tau_u$ is the time constant for electrically charging the spacer and $\tau_d$ is the time constant for completely releasing the electric charge from the spacer.

2. An image-forming apparatus according to claim 1, wherein said cold cathode electron-emitting devices are surface conduction electron-emitting devices.

3. An image-forming apparatus according to claim 2, wherein the constants α and β satisfy the relationship of 2·α·β≦5.

4. An image-forming apparatus according to claim 1, wherein said cold cathode electron-emitting devices are field emission type electron-emitting devices.

5. An image-forming apparatus according to claim 4, wherein the constants α and β satisfy the relationship of 2·α·β≦10.

6. An image-forming apparatus according to any of claims 1 to 5, wherein said spacers are formed by layering a high resistance thin film on the surface of an insulating member and said high resistance thin film is electrically connected to electrodes on the device substrate, or a wire and an acceleration electrode, showing different respective potentials.

7. An image-forming apparatus according to claim 6, wherein said high resistance thin film comprises fine grains.

8. An image-forming apparatus according to claim 6, wherein said high resistance thin film is made of noncrystalline film.

9. A method of driving an image-forming apparatus comprising a device substrate carrying thereon an electron source comprising a plurality of cold cathode type electron-emitting devices, an acceleration electrode arranged oppositely relative to said device substrate for accelerating electrons emitted from said electron source, an envelope having a hermetically sealed structure for maintaining a vacuum condition between said device substrate and said acceleration electrode and a number of spacers for supporting said envelope, characterized in that the time period ΔT for displaying a frame of an image and the time period Δt for driving a device satisfy the relationship expressed by the formula below;

$$(1-\exp(-\Delta t/\tau_u))/(1-\exp(-\Delta T/\tau_d)) < (2 \cdot \alpha \cdot \beta) \cdot l^2 \cdot d^2/V_a \cdot 8/|R \cdot Q'|$$

where R is the electric resistance of each spacer in the direction perpendicular to the device substrate, Q' is the rate of change of the electric charge of the spacer surface, $\tau_u$ is the time constant for electrically charging the spacer, $\tau_d$ is the time constant for completely releasing the electric charge from the spacer, l is the distance between the electron-emitting devices and the corresponding respective spacers, d is the distance between the electron-emitting devices and the acceleration electrode, $V_a$ is the electric potential of the acceleration electrode, α is a constant defined by the positional arrangement of the members that determine the potential profile within the image-forming apparatus and β is a constant defining the allowable deviational range of the brilliant points on the image display member of the apparatus.

10. A method of driving an image-forming apparatus according to claim 9, wherein said cold cathode electron-emitting devices are surface conduction electron-emitting devices.

11. A method of driving an image-forming apparatus according to claim 10, wherein the constants α and β satisfy the relationship of 2·α·β≦5.

12. A method of driving an image-forming apparatus according to claim 9, wherein said cold cathode electron-emitting devices are field emission type electron-emitting devices.

13. A method of driving an image-forming apparatus according to claim 12, wherein the constants a and β satisfy the relationship of 2·α·β≦10.

14. A method of driving an image-forming apparatus according to any of claims 9 to 13, wherein said spacers are formed by layering a high resistance thin film on the surface of an insulating member and said high resistance thin film is electrically connected to electrodes on the device substrate, or a wire and an acceleration electrode, showing different respective potentials.

15. A method of driving an image-forming apparatus according to claim 14, wherein said high resistance thin film comprises fine grains.

16. A method of driving an image-forming apparatus according to claim 14, wherein said high resistance thin film is made of noncrystalline film.

* * * * *

UNITED STATES PATENT AND TRADEMARK OFFICE
CERTIFICATE OF CORRECTION

PATENT NO. : 6,005,540

DATED : December 21, 1999

INVENTORS : Katsuhiko Shinjo, et al.

It is certified that error appears in the above-identified patent and that said Letters Patent is hereby corrected as shown below:

COVER PAGE

Under [30] Foreign Application Priority Data, "8-274195" should read --9-274195--.

COLUMN 3

Line 65, "10pA" should read --10$\mu$A--.

COLUMN 5

Line 46, ".8 | R·Q'|" should read --.8/| R·Q'|--.

COLUMN 8

Line 52, "2·$\alpha\beta$" should read --2·$\alpha$·$\beta$--.

COLUMN 11

Line 40, "$\beta$" should read --$\rho$--.

COLUMN 12

Line 2, "(-$\Delta$T/$\tau_{d)}$" should read --(-$\Delta$T/$\tau_d$)--.
Line 6, "(1-exp (-t/$\tau_u$))" should read --(1-exp (-$\Delta$t/$\tau_u$))--;
Line 31, "a1" should read --$\alpha$1--; and
Line 41, "a" should read --$\alpha$--.

UNITED STATES PATENT AND TRADEMARK OFFICE
CERTIFICATE OF CORRECTION

PATENT NO. : 6,005,540

DATED : December 21, 1999

INVENTORS : Katsuhiko Shinjo, et al.

Page 2 of 2

It is certified that error appears in the above-identified patent and that said Letters Patent is hereby corrected as shown below:

COLUMN 26

Line 58, "$I_e.$" should read --$I_e$--.

COLUMN 34

Line 26, "$\Delta t_{mes>>\tau u}$" should read --$\Delta t_{mes}>>\tau u$--; and
   Line 34, "(AT=16.7ms)," should read --$\Delta$T=16.7ms),--.

COLUMN 40

Line 28, "a" should read --$\alpha$--.

Signed and Sealed this

Sixth Day of February, 2001

Attest:

Attesting Officer

Q. TODD DICKINSON

Director of Patents and Trademarks